United States Patent
Zhao et al.

(10) Patent No.: US 12,121,192 B2
(45) Date of Patent: Oct. 22, 2024

(54) MOBILE DEVICE DOCKING METHOD AND MOBILE DEVICE

(71) Applicant: Qfeeltech (Beijing) Co., Ltd., Beijing (CN)

(72) Inventors: Lei Zhao, Beijing (CN); Sichen Xu, Beijing (CN); Yiming Zhang, Beijing (CN); Zhen Chen, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 372 days.

(21) Appl. No.: 17/465,229

(22) Filed: Sep. 2, 2021

(65) Prior Publication Data

US 2021/0393099 A1 Dec. 23, 2021

Related U.S. Application Data

(63) Continuation of application No. PCT/CN2020/078539, filed on Mar. 10, 2020.

(30) Foreign Application Priority Data

Mar. 26, 2019 (CN) .......................... 201910230935.1

(51) Int. Cl.
*B60L 53/60* (2019.01)
*A47L 9/00* (2006.01)
(Continued)

(52) U.S. Cl.
CPC .......... *A47L 11/4005* (2013.01); *A47L 9/0063* (2013.01); *A47L 9/009* (2013.01);
(Continued)

(58) Field of Classification Search
CPC .... A47L 11/4005; A47L 9/0063; A47L 9/009; A47L 9/2805; A47L 9/2852;
(Continued)

(56) References Cited

U.S. PATENT DOCUMENTS

| 10,300,804 B2 | 5/2019 | Salasoo |
| 10,335,004 B2 | 7/2019 | Fong et al. |

(Continued)

FOREIGN PATENT DOCUMENTS

| CN | 104055462 A | 9/2014 |
| CN | 106308685 A | 1/2017 |

(Continued)

OTHER PUBLICATIONS

International Search Report with English translation, and Written Opinion with partial English translation, issued on Jun. 16, 2020, in International Application No. PCT/CN2020/078539, filed on Mar. 10, 2020 (8 pages).

(Continued)

*Primary Examiner* — Ig T An
(74) *Attorney, Agent, or Firm* — MILLBURN IP PLLC

(57) ABSTRACT

A docking method executable by a mobile device is provided. The docking method includes obtaining a stored target location of a docking station, and navigating to the target location. The docking method also includes: during the navigation and/or at the target location, based on a determination that a guidance signal is not detected, performing a regional search. The docking method also includes: during the navigation, or at the target location, or during the regional search, based on a determination that the guidance signal is detected, moving, under the guidance of the guidance signal, to the docking station. Performing the regional search includes determining a basic search zone, searching for the guidance signal while moving along boundaries of the basic search zone, and based on a determination that the guidance signal has not been detected when a termination condition is satisfied, terminating the regional search.

11 Claims, 16 Drawing Sheets

(51) Int. Cl.
*A47L 9/28* (2006.01)
*A47L 11/24* (2006.01)
*A47L 11/28* (2006.01)
*A47L 11/40* (2006.01)
*G05D 1/00* (2024.01)

(52) U.S. Cl.
CPC ........... *A47L 9/2805* (2013.01); *A47L 9/2852* (2013.01); *A47L 9/2873* (2013.01); *A47L 11/24* (2013.01); *A47L 11/28* (2013.01); *A47L 11/4011* (2013.01); *A47L 11/4061* (2013.01); *A47L 11/4066* (2013.01); *A47L 11/4091* (2013.01); *B60L 53/60* (2019.02); *G05D 1/0088* (2013.01); *G05D 1/0217* (2013.01); *A47L 2201/022* (2013.01); *A47L 2201/04* (2013.01); *G05D 1/0231* (2013.01)

(58) Field of Classification Search
CPC ........ A47L 9/2873; A47L 11/24; A47L 11/28; A47L 11/4011; A47L 11/4061; A47L 11/4066; A47L 11/4091; A47L 2201/022; A47L 2201/04; A47L 9/30; A47L 2201/02; A47L 1/02; B60L 53/60; B60L 53/37; B60L 3/0015; G05D 1/0088; G05D 2201/02; G05D 1/0248; G05D 1/0225; H02J 7/00
See application file for complete search history.

(56) References Cited

U.S. PATENT DOCUMENTS

| | | | |
|---|---|---|---|
| 2011/0057836 A1* | 3/2011 | Ische | G01S 5/0236 |
| | | | 342/357.66 |
| 2012/0049798 A1 | 3/2012 | Cohen et al. | |
| 2014/0288709 A1 | 9/2014 | Sim et al. | |
| 2018/0052468 A1* | 2/2018 | Choe | G05D 1/0274 |
| 2018/0246518 A1* | 8/2018 | Vogel | G05D 1/0274 |
| 2018/0249872 A1 | 9/2018 | Park | |
| 2019/0059677 A1 | 2/2019 | Huang | |
| 2019/0155295 A1* | 5/2019 | Moore | G05D 1/0225 |
| 2019/0187717 A1 | 6/2019 | He et al. | |
| 2020/0121148 A1* | 4/2020 | Hoffman | H02J 7/0045 |

FOREIGN PATENT DOCUMENTS

| | | |
|---|---|---|
| CN | 106451635 A | 2/2017 |
| CN | 106468920 A | 3/2017 |
| CN | 106814739 A | 6/2017 |
| CN | 107124014 A | 9/2017 |
| CN | 107910915 A | 4/2018 |
| CN | 108303984 A | 7/2018 |
| CN | 108733048 A | 11/2018 |
| CN | 108988403 A | 12/2018 |
| CN | 108988423 A | 12/2018 |
| CN | 208375332 U | 1/2019 |
| CN | 109508014 A | 3/2019 |
| CN | 109674402 A | 4/2019 |
| CN | 106239504 B | 5/2019 |
| EP | 3501762 A1 | 6/2019 |
| KR | 101722768 B1 | 4/2017 |
| WO | 2018038488 A1 | 3/2018 |

OTHER PUBLICATIONS

Communication pursuant to Article 94(3) EPC, dated Jul. 26, 2023, issued in European Patent Application No. 20780024.4 (6 pages).
First Office Action issued on Feb. 2, 2021, in Chinese Patent Application No. 201910230935.1, and English machine translation thereof (26 pages).
Extended European Search Report dated Nov. 4, 2022, issued in European Patent Application No. 20780024.4 (11 pages).

* cited by examiner

MOBILE DEVICE DOCKING METHOD AND MOBILE DEVICE

CROSS-REFERENCE TO RELATED APPLICATIONS

This application is a continuation of International Patent Application No. PCT/CN2020/078539, filed on Mar. 10, 2020, which claimed the priority to Chinese Patent Application No. 201910230935.1, filed on Mar. 26, 2019. The entire content of the above-mentioned applications is incorporated herein by reference.

TECHNICAL FIELD

The present disclosure generally relates to the technical field of mobile devices and, more specifically, to a mobile device docking method and a mobile device configured to execute the docking method.

BACKGROUND

Automatic recharging technologies have been widely implemented in various mobile devices powered by rechargeable batteries. Currently there are two types of automatic docking methods. In a first method, a docking station continuously transmits a guidance signal, and a receiver on the mobile device detects the guidance signal. The mobile device moves, under the guidance of the guidance signal, to the docking station to perform the charging of one or more rechargeable batteries carried thereon. In a second method, a detector or sensor (e.g., a camera or a laser-based distance measuring device) may be mounted on the mobile device. An identification feature (e.g., a planar or 3D shape or patterned image recognizable by the camera, or an image pattern formed by alternately arranged high absorption material and high reflective material recognizable by the laser-based distance measuring device, as shown in FIG. 6A and FIG. 6B), may be mounted on the docking station. The sensor on the mobile device may detect and recognize the identification feature on the docking station, thereby identifying and discovering the docking station. The mobile device may move to the docking station to perform charging based on information extracted from the identification feature. In actual scenarios, because the mobile device often cannot find the docking station, battery recharging failure often occurs.

Based on the current knowledge, there are three primary reasons for the failure of the recharging of the mobile device:

1. The power cord of the docking station has not been disconnected from the power outlet, i.e., the docking station is powered on. However, due to positioning errors, corrections of the coordinates, or being kicked or collided by an external object, the actual location of the docking station has changed. Thus, the location of the docking station stored in the mobile device may deviate from the actual location of the docking station.

2. The power cord of the docking station has been disconnected from the power outlet, and the docking station has been manually moved to another power supplying location and has been re-supplied with power.

3. The power cord of the docking station has been disconnected from the power outlet, and the docking station has been arbitrarily placed at another location, and no power has been supplied to the docking station.

SUMMARY OF THE DISCLOSURE

To resolve the issues associated with conventional technologies, the present disclosure provides a docking method for a mobile device and a mobile device configured to execute, implement, or perform the docking method. With the disclosed docking method, the success rate of recharging of the mobile device can be increased.

According to a first aspect of the present disclosure, a docking method executable by a mobile device is provided. The docking method includes obtaining a stored target location of a docking station. The docking method includes navigating to the target location. The docking method includes: during the navigation and/or at the target location, based on a determination that a guidance signal is not detected, performing a regional search to search for the guidance signal, the guidance signal being a signal transmitted by the docking station, receivable by the mobile device, and configured to guide the mobile device to navigate to docking station. The docking method includes: during the navigation, or at the target location, or during the regional search, based on a determination that the guidance signal is detected, moving, under the guidance of the guidance signal, to the docking station. Performing the regional search includes determining a basic search zone by setting one or more boundary thresholds based on the target location. Performing the regional search also includes searching for the guidance signal while moving along boundaries of the basic search zone. Performing the regional search further includes: based on a determination that the guidance signal has not been detected when a termination condition is satisfied, terminating the regional search along the boundaries of the basic search zone.

According to a second aspect of the present disclosure, a docking method executable by a mobile device is provided. The docking method includes obtaining a stored target location of a docking station. The docking method includes navigating to the target location. The docking method includes: during the navigation and/or at the target location, based on a determination that the docking station is not discovered, performing a regional search to search for the docking station. The docking method includes: during the navigation, or at the target location, or during the regional search, based on a determination that the docking station is discovered, moving to the docking station. Performing the regional search includes: determining a basic search zone by setting one or more boundary thresholds based on the target location. Performing the regional search also includes searching for the docking station while moving along boundaries of the basic search zone. Performing the regional search further includes: based on a determination that the docking station has not been discovered when a termination condition is satisfied, terminating the regional search along the boundaries of the basic search zone.

According to a third aspect of the present disclosure, a mobile device is provided. The mobile device includes a motion mechanism configured to move the mobile device on a surface. The mobile device also includes a receiver configured to detect a guidance signal transmitted from a docking station. The mobile device also includes a processor operably coupled with the motion mechanism and the receiver. The mobile device also includes a data storage device configured to store processor-executable instructions. The processor is configured to obtain a stored target location of the docking station from the data storage device. The processor is configured to control the motion mechanism to navigate the mobile device to the target location. The processor is configured to, based on a determination that the guidance signal is not detected during the navigation and/or at the target location, control the motion mechanism and the receiver to perform a regional search to search for the guidance signal. The guidance signal is configured to guide the mobile device to navigate to docking station. The processor is configured to, based on a determination that the guidance signal is detected during the navigation, at the target location, or during the regional search, control the motion mechanism to navigate the mobile device, under the guidance of the guidance signal, to the docking station. When performing the regional search, the processor is configured to determine a basic search zone by setting one or more boundary thresholds based on the target location. When performing the regional search, the processor is also configured to control the motion mechanism and the receiver to search for the guidance signal along boundaries of the basic search zone. When performing the regional search, the processor is further configured to, based on a determination that the guidance signal has not been detected when a termination condition is satisfied, terminate the regional search along the boundaries of the basic search zone.

According to a fourth aspect of the present disclosure, a mobile device is provided. The mobile device includes a motion mechanism configured to move the mobile device on a surface. The mobile device also includes a sensor configured to discover a docking station. The mobile device also includes a processor operably coupled with the motion mechanism and the sensor. The mobile device also includes a data storage device configured to store processor-executable instructions. The processor is configured to obtain a stored target location of the docking station from the data storage device. The processor is configured to control the motion mechanism to navigate the mobile device to the target location. The processor is configured to, based on a determination that the docking station is not discovered during the navigation and/or at the target location, control the motion mechanism and the sensor to perform a regional search to search for the docking station. The processor is configured to, based on a determination that the docking station is discovered during the navigation, at the target location, or during the regional search, control the motion mechanism to navigate the mobile device to the docking station. When performing the regional search, the processor is configured to determine a basic search zone by setting one or more boundary thresholds based on the target location. When performing the regional search, the processor is also configured to control the motion mechanism and the sensor to search for the docking station along boundaries of the basic search zone. When performing the regional search, the processor is further configured to, based on a determination that the docking station has not been discovered when a termination condition is satisfied, terminate the regional search along the boundaries of the basic search zone.

The technical solutions of the present disclosure include the following advantageous effects:

During the recharging process of the mobile device, because a regional search process of the docking station (or the guidance signal transmitted by the docking station) is implemented, even if there is a deviation between the actual location of the docking station and the stored location of the docking station, the mobile device is configured to automatically search for and discover the docking station at a high probability. As a result, the success rate of recharging of the mobile device can be increased.

It should be appreciated that the above general descriptions and the detailed descriptions are illustrative and explanatory, and are not intended to limit the scope of the present disclosure.

BRIEF DESCRIPTION OF THE DRAWINGS

The accompanying drawings are incorporated into the specification as parts of the specification. The accompanying drawings show exemplary embodiments of the present disclosure. The drawings, together with the specification, illustrate and explain the principles of the present disclosure. In the drawings.

DETAILED DESCRIPTION

Figure 1A:
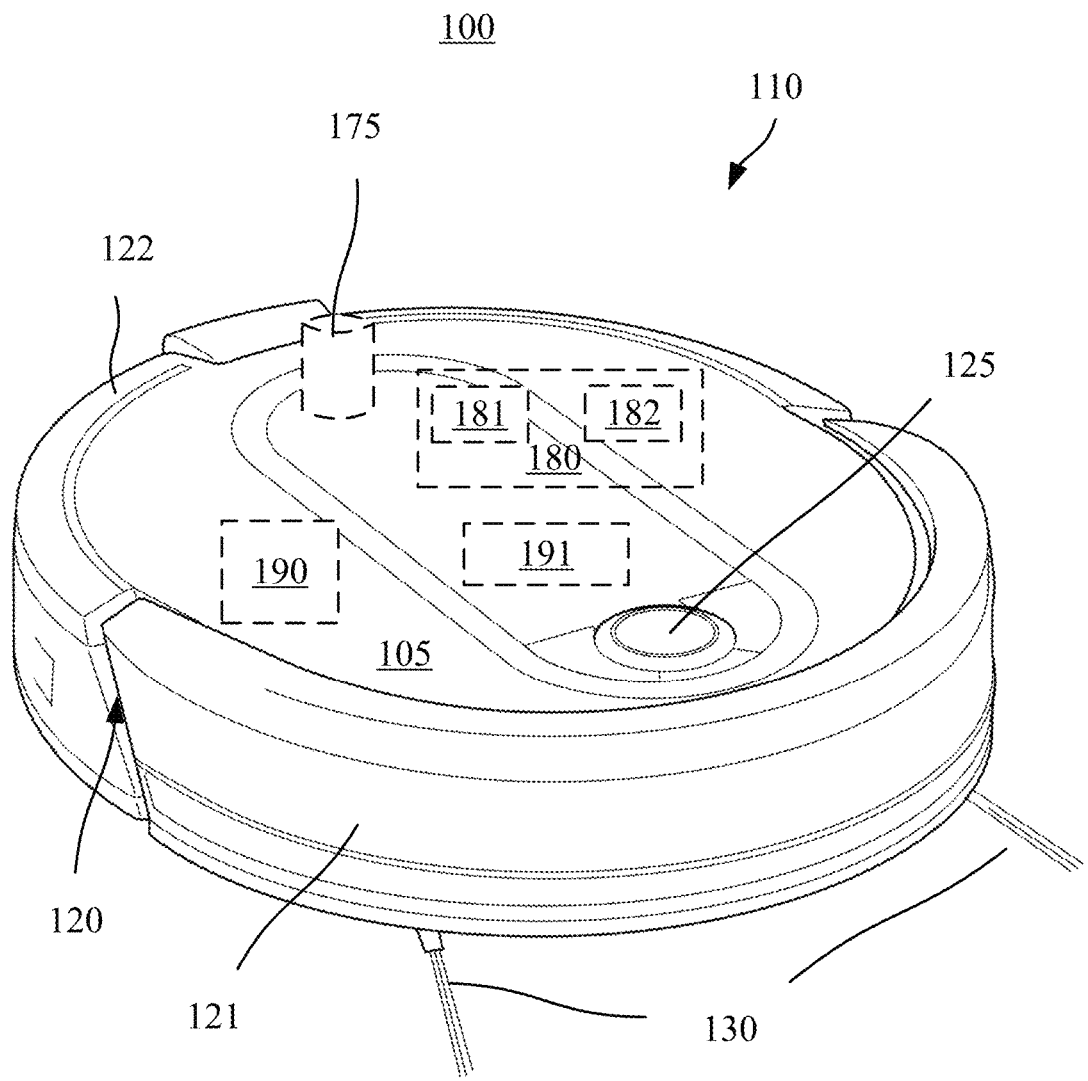
FIG. 1A is a schematic perspective view of a mobile device, according to an embodiment of the present disclosure.

Next, the exemplary embodiments illustrated in the drawings will be described in detail. In the descriptions of drawings, unless otherwise indicated, the same numerals in different drawings represent the same or similar elements. The implementations of the present disclosure, as described in the illustrative embodiments, do not represent all implementations consistent with the present disclosure. The described implementations are merely some examples of the device and method that are consistent with some aspects of the present disclosure, and that are consistent with the inventive concept described in the claims.

The singular forms of "a," "an," and "the" are intended to include the plural forms as well, unless the context indicates otherwise. The terms "comprise," "comprising," "include," and the like specify the presence of stated features, steps, operations, elements, and/or components, and do not preclude the presence or addition of one or more other features, steps, operations, elements, components, and/or groups.

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B," and may be replaced by "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

In the present disclosure, the term "recharging" refers to the process of the mobile device returning to the docking station to perform charging (e.g., charging a battery of the mobile device). The docking method for the mobile device, as provided in the present disclosure, may be applied to any suitable mobile device.

The mobile device refers to a smart mobile apparatus or machine configured to execute predetermined tasks within a predetermined zone. The mobile device may include, but not be limited to, a robot vacuum cleaner ("RVC"), such as a smart floor sweeping device, a smart floor mopping device, a window cleaning robot, etc. The mobile device may be a logistics robot, a moving robot, etc. The mobile device may be a lawn mowing robot, a de-icing robot, etc. The mobile device may be a companion type mobile robot, such as a smart electronic pet, a nanny robot. The mobile device may be a service type mobile robot, such as a reception robot for hotels, inns, meeting places. The mobile device may be an industrial inspection smart device, such as a power line inspection robot, a smart forklift, etc. The mobile device may be a security robot, such as a home use or commercial use smart guard robot, etc.

In some embodiments, the present disclosure provides a docking method for a mobile device. The method may be implemented by the mobile device. The method may include:

retrieving a stored target location of a docking station;
navigating to the target location;
based on a determination that a target is not discovered during the navigation, and/or at the target location, performing a regional search for the target; and
based on a determination that the target is discovered during the navigation, or at the target location, or during the regional search, moving to the docking station to perform charging;

In some embodiments, the target may include: the docking station, or a guidance signal transmitted by the docking station.

In some embodiments, the target location may be: a candidate location, a signal sensing location, or a docking station discovering location.

A candidate location may be a stored location of the docking station.

A signal sensing location may be a location where the guidance signal is detectable by the mobile device, which includes a location where the guidance signal was previously detected at least once.

A docking station discovering location may be a location where the docking station is discoverable by the mobile device, which includes a location where the docking station was previously discovered. The docking station may be discovered by the mobile device through various manners. For example, an identification feature such as a bar code image may be provided at the docking station, and a detector or sensor (e.g., a camera or a laser-based distance measuring device) provided at the mobile device may identify the identification feature and recognize the docking station.

In some embodiments, the target location may be a relatively accurate location. For example, using a two-dimensional coordinate system as an example, the target location may be presented as (x0, y0). Alternatively, in some embodiments, the target location may be a generalized location, i.e., a location within a predetermined range of errors, such as (x0±δx, y0±δy), where δx, δy represent errors. Locations near the target location of (x0, y0) within the range of errors are also referred to as target locations. In some embodiments, a candidate location may also include a location within a predetermined nearby zone of the stored location of the docking station, such as a circular nearby zone having a radius of 20 cm surrounding the candidate location (within such a nearby zone, for the mobile device carrying a camera, a light detection and ranging ("Lidar") sensor, and/or a proximity sensor, the location of the docking station may be determined through the assistance of the camera and/or the proximity sensor. Therefore, locations within the nearby zone are also referred to as candidate locations). A signal sensing location may also include locations within a nearby zone of the location where the guidance signal is detectable and/or was detected previously by the mobile device. For example, locations within a nearby zone having a radius of 5 cm surrounding the signal sensing location may also be regarded as the signal sensing locations (because the sensitivity of the receiver of the guidance signal may be different for different models of the receiver, the detectable range may be larger for sensitive ones, and the detectable range may be relatively smaller for the less sensitive ones. A person having ordinary skills in the art would appreciate that the scope of protection of the present disclosure should not be limited by the properties of the receiver).

It should be understood that the candidate location may be an initial location of the docking station when the mobile device is started (e.g., powered on) at the docking station, or may be a location of the docking station encountered and stored by the mobile device while the mobile device is performing a predetermined task (e.g., cleaning the floor).

The signal sensing location may be a location where the guidance signal is detectable and/or was previously detected by the mobile device. In some embodiments, the signal sensing location may be a location of the mobile device when the mobile device detects the guidance signal during movement, or may be a location another device stored when detecting the guidance signal. Signal sensing location information (i.e., information relating to the signal sensing location) may be transferred to the mobile device from the other device using a mobile data storage device, a wireless network, a cloud server, etc.

Because the docking station may be moved from one place to another during the operations of the mobile device, the mobile device may encounter the docking station or detect the guidance signal at multiple locations during operations. Therefore, even in the situation where there is only one docking station, the mobile device may store multiple target locations. In the scenario where there are multiple docking stations, the target locations may include multiple stored candidate locations, multiple stored signal sensing locations, and/or multiple docking station discovering locations. Because the mobile device may not have knowledge of the actual current location of the docking station, the mobile device can only attempt to search for the docking station from the previously stored target locations (e.g., stored in the data storage device of the mobile device).

FIG. 1A is a schematic perspective view of a device 100, according to an embodiment of the present disclosure. The device 100 may also be referred to as a mobile device 100, a cleaning device 100, a vacuum cleaner 100, a vacuum cleaning robot 100, a sweeping-mopping robot 100, or a cleaning robot 100. For discussion purposes, the device 100 is referred to as a mobile device 100. The mobile device 100 may include a main body 110. The main body 110 may have any suitable shape, such as a circular shape (as shown in FIG. 1A), a rectangle shape, a square shape, an oval shape, or a combination thereof. The main body 110 may include an exterior housing (or referred to as a housing) 105 for enclosing and accommodating various elements, parts, or components of the mobile device 100. The main body 110 (or the housing 105) may include a first bumper (or first cover, front bumper) 121 and a second bumper (or second cover, rear bumper) 122 at a circumferential side of the main body 110. The first bumper 121 may be separated from the second bumper by one or more gaps 120. At least one of the first bumper 121 or the second bumper 122 may be resiliently coupled with the housing 105 or another part of the main body 110 through an elastic member, such as a spring (not shown). When the mobile device 100 collides with an obstacle, such as a wall or furniture, the first bumper 121 or the second bumper 122 may retract when pushed by the obstacle, thereby providing a buffer or an impact absorption for the mobile device 100. One or more collision sensors may be disposed at the first bumper 121 and/or the second bumper 122. When the first bumper 121 and/or the second bumper 122 collides with an object, the one or more collision sensors may detect the collision and generate a signal indicating the occurrence of the collision. In some embodiments, the collision sensor may detect a potential collision and generate a warning signal, or trigger a controller (such as a processor 190) to make a collision avoidance control. For example, the processor 190 may control the operation of the mobile device 100 to stop the mobile device 100 or change the moving direction of the mobile device 100 to avoid the collision. The mobile device 100 may also include a camera 125. The camera 125 may be configured to capture one or more images of the environment in which the mobile device 100 operates. For illustrative purposes, the camera 125 is shown as being mounted at the front portion (e.g., behind a protective cover disposed at the front bumper 121) of the mobile device 100. It is understood that the camera 125 may be mounted at any other location of the mobile device 100, e.g., a top portion of the housing, a side portion, a back portion, etc. The orientation of the camera 125 may be in any suitable directions, such as facing front, facing back, facing sides, facing up (e.g., ceiling of a room), facing a direction forming an acute angle relative to the moving direction of the cleaning device, etc. In some embodiments, two or more cameras may be disposed at various portions of the mobile device 100. In some embodiments, the facing direction of each camera may be adjustable through a manual adjustment or an electrical adjustment. In some embodiments, the facing direction of a camera may be fixed. In some embodiments, the camera 125 may capture an image of the environment in which the mobile device operates, and may identify a docking station from the images through image analysis. In some embodiments, the docking station may be directly identified from the images. In some embodiments, identifiable features (or identification features) mounted to the docking station may be identified through image analysis.

The mobile device 100 may include the processor 190. The processor 190 may be a controller. The processor 190 may be any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The processor 190 may perform various control functions controlling the operations of various components of the mobile device 100. For example, the processor 190 may analyze the images to extract information (e.g., identify objects, which may be obstacles for the movement of the mobile device 100) for the purpose of localization and mapping of the mobile device 100. The processor 190 may process data and/or signals received by the mobile device 100. For example, the processor 190 may process a guidance signal received by the mobile device 100, and may navigate the mobile device 100 to a docking station for redocking based on the guidance provided by the guidance signal. As another example, the processor 190 may process patterned images recognized by a camera or a laser-based distance measuring device to identify a docking station and to extract information (e.g., distance, direction) relating to the docking station. The processor 190 may control the mobile device 100 to move to the docking station based on guidance provided by the guidance signal, and/or information extracted from the patterned images relating to the docking station.

The mobile device 100 may include a data storage device 191 configured to store data, signals, images, processor-executable instructions or codes, etc. The data storage device 191 may be configured to store various locations, such as a candidate location of a docking station, a signal sensing location where the mobile device 100 detects a guidance signal transmitted by the docking station, and/or a location where the mobile device previously discovered the docking station. The data storage device 191 may also be referred to as a non-transitory computer-readable medium. The non-transitory computer-readable medium may be any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc. The processor 190 may store data into the data storage device 191, or retrieve data from the data storage device 191.

The mobile device 100 may include a communication device 180 configured to communicate with another device, such as a cloud server, a docking station, a smart phone, another similar mobile device, etc. The communication device 180 may include a receiver 181 configured to receive data or signals from another device, and a transmitter 182 configured to transmit data or signals to another device. In some embodiments, the receiver 181 and the transmitter 182 may be an integral transceiver. The mobile device 100 may further include one or more sweeping elements or mechanisms, such as one or more brushes. FIG. 1A shows two side brushes 130 of a sweeping unit 145 (shown in FIG. 1B).

Figure 6A:
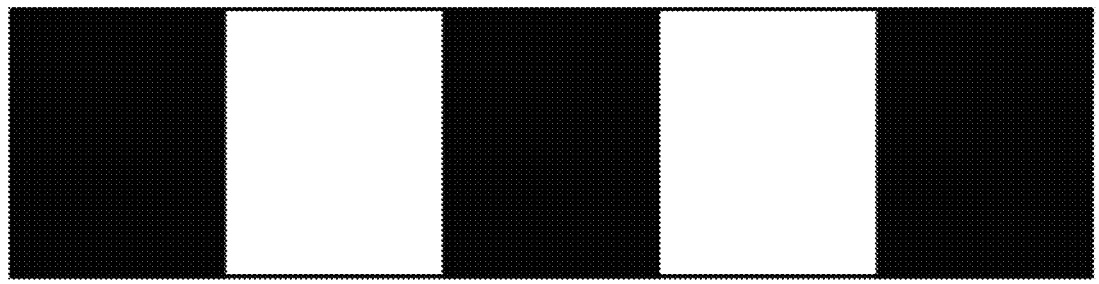
FIG. 6A is an exemplary patterned image recognizable by the mobile device, according to an embodiment of the present disclosure.
Figure 6B:
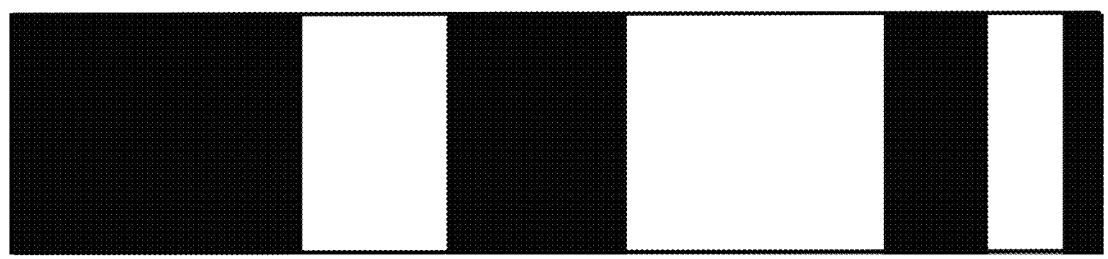
FIG. 6B is an exemplary patterned image recognizable by the mobile device, according to an embodiment of the present disclosure.

In some embodiments, the mobile device 100 may include a sensor 175 configured to detect or discover a docking station based on shapes or patterned images, or any other identifiable visual features. For example, in some embodiments, the sensor 175 may be a laser-based distance measuring device, such as Light Detection and Ranging ("Lidar") sensor. In some embodiments, the mobile device 100 may include both the camera 125 and the sensor 175 for discovering the docking station. In some embodiments, the mobile device 100 may include only the camera 125 for discovering the docking station, but not the sensor 175. In some embodiments, the mobile device 100 may include only the sensor 175 for discovering the docking station, but not the camera 125. The sensor 175 may be configured to detect an identification (or identifiable) feature, such as a bar code image or a patterned image shown in FIG. 6A and FIG. 6B. In some embodiments, the processor 190 may be configured to recognize the patterned image detected by the sensor 175, and determine that the docking station has been detected or discovered. In some embodiments, the camera 125 may also be configured to recognize the patterned image shown in FIG. 6A and FIG. 6B, or the processor 190 may be configured to recognize the patterned image captured by the camera 125 and determine that the docking station has been detected or discovered. The bar code images shown in FIG. 6A and FIG. 6B may be formed by alternately arranged rectangular bars. The black bars and the white bars may be formed or printed with a high absorption material for laser and a high reflective material for laser, respectively. The pattern formed by the black bars and the white bars may be a repeating pattern, or may be a non-repeating pattern. In some embodiments, the processor 190 or the sensor 175 may recognize the patterned image based on the relationship between the bars or area(s) formed by the high absorption material and the bars or area(s) formed by the high reflective material. Any suitable relationship, such as the ratio between the widths, the ratio between the areas, etc., may be used for detecting or identifying the docking station. The present disclosure is not limited to the methods or image patterns for detecting or discovering the docking station. After the sensor 175 detects or discovers the docking station, the mobile device 100 may move directly to the docking station based on information obtained by the sensor 175 regarding the location, distance, and/or direction of the docking station. In some embodiments, the sensor 175 may be referred to as a proximity sensor or a distance-measuring sensor.

Figure 1B:
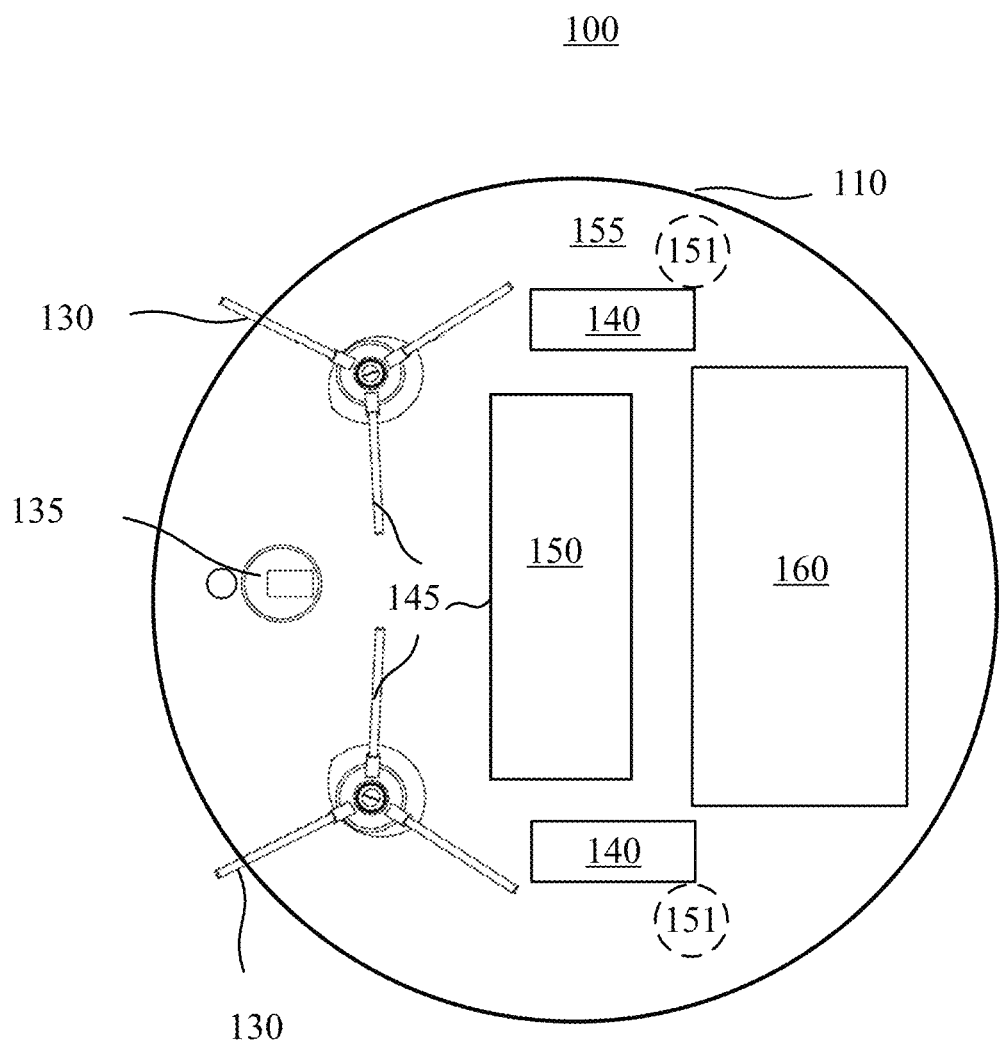
FIG. 1B is a schematic bottom view of the mobile device shown in FIG. 1A, according to an embodiment of the present disclosure.

FIG. 1B is a schematic illustration of a bottom view of the structural configuration of the mobile device 100, according to an embodiment of the present disclosure. Elements or structures shown in the bottom view are based on the mobile device 100 being a cleaning device. When the mobile device 100 is another type of device, the elements and structures may be different. The bottom of the main body 110 of the mobile device 100 may include a bottom surface or plate 155. In some embodiments, the bottom surface 155 may be formed by a plurality of surfaces, although for illustrative purposes, the bottom surface 155 is shown as a single piece. The sweeping unit 145 may be mounted to the bottom surface 155. The sweeping unit 145 may include the side brushes 130 and a main brush 150 disposed at a relatively center location of the bottom surface 155. The side brushes 130 and/or the main brush 150 may be mounted to the bottom surface 155, or may be mounted to other components inside the mobile device 100 and may extend out of the housing through an opening provided at the bottom surface 155. Although not shown, in some embodiments, the main brush 150 may be configured to sweep dirt or trash into a trash storage tank disposed inside the mobile device 100, at a top portion, or a side portion of the mobile device 100, or to sweep dirt or trash such that they may be vacuumed into a vacuum port.

The mobile device 100 may include a motion mechanism configured to enable the mobile device 100 to move along a surface (e.g., a floor, a ground). The motion mechanism may include an omnidirectional wheel 135 disposed at a front portion of the bottom surface 155. The omnidirectional wheel 135 may be a non-driving, passively rotating wheel. The motion mechanism may also include at least two driving wheels 140 disposed at two sides of the bottom surface 155. The positions of the omnidirectional wheel 135 and the two driving wheels 140 may form a triangle, as shown in FIG. 1B, to provide a stable support to the main body 110 of the mobile device 100. In some embodiments, the driving wheels 140 may be rotatable around a rotation axis passing through a center of symmetry of the driving wheels 140. In some embodiments, the driving wheels 140 may not be rotatable around an axis perpendicular to the bottom surface 155. The omnidirectional wheel 135 may freely rotate around an axis perpendicular to the bottom surface 155, and around an axis passing through a center of symmetry of the omnidirectional wheel 135. The omnidirectional wheel 135 and the driving wheels 140 together move the mobile device 100 in any desirable direction. The at least two driving wheels 140 may be independently driven by at least two electric motors 151 disposed inside the main body 110. Although two motors 151 are shown for illustrative purposes, in some embodiments, the at least two driving wheels 140 may be driven by a single motor. The motors 151 are parts of the motion mechanism. When the two driving wheels 140 are driven at different speeds, the rotation speed differential of the driving wheels 140 may cause the mobile device 100 to turn. In some embodiments, the driving wheels 140 may be rotatable also around an axis perpendicular to the bottom surface 155.

In some embodiments, the mobile device 100 may include a mopping mechanism 160 disposed at the bottom surface 155. The mopping mechanism 160 may include at least one movable mopping plate attached with a mop to mop the surface to be cleaned (e.g., a floor). For illustrative purposes, the mopping mechanism 160 is shown as a rectangle in FIG. 1B. The mopping mechanism 160 may have any suitable shapes, such as a round shape, a square shape, a triangle shape, or a portion or a combination thereof. When the mobile device 100 is another type of cleaning device, the mopping mechanism 160 may be replaced by another suitable type of cleaning mechanism. The processor 190 shown in FIG. 1A may control various components of the mobile device 100, including the motion mechanism, and the sweeping unit 145, and the mopping mechanism 160. In some embodiments, the motion mechanism, the sweeping unit 145, and the mopping mechanism 160 may share motors. In some embodiments, the motion mechanism, the sweeping unit 145, and the mopping mechanism 160 may be independently driven by separate motors. In some embodiments, when the mobile device 100 is equipped with the vacuum function instead of the mopping function, the element 160 may be a vacuum port.

During operations of the mobile device 100, the processor 190 may control various components of the motion mechanism (e.g., the electric motors that control the wheels 140) to control the movement of the mobile device 100, and may control the receiver 181 and/or the sensor 175 to detect the guidance signal and/or the docking station.

FIGS. 2A-2D are flowcharts showing docking methods for the mobile device 100, according to various embodiments of the present disclosure. Various embodiments are described below with reference to FIGS. 2A-2D and FIGS. 4C-4E.

Figure 2A:
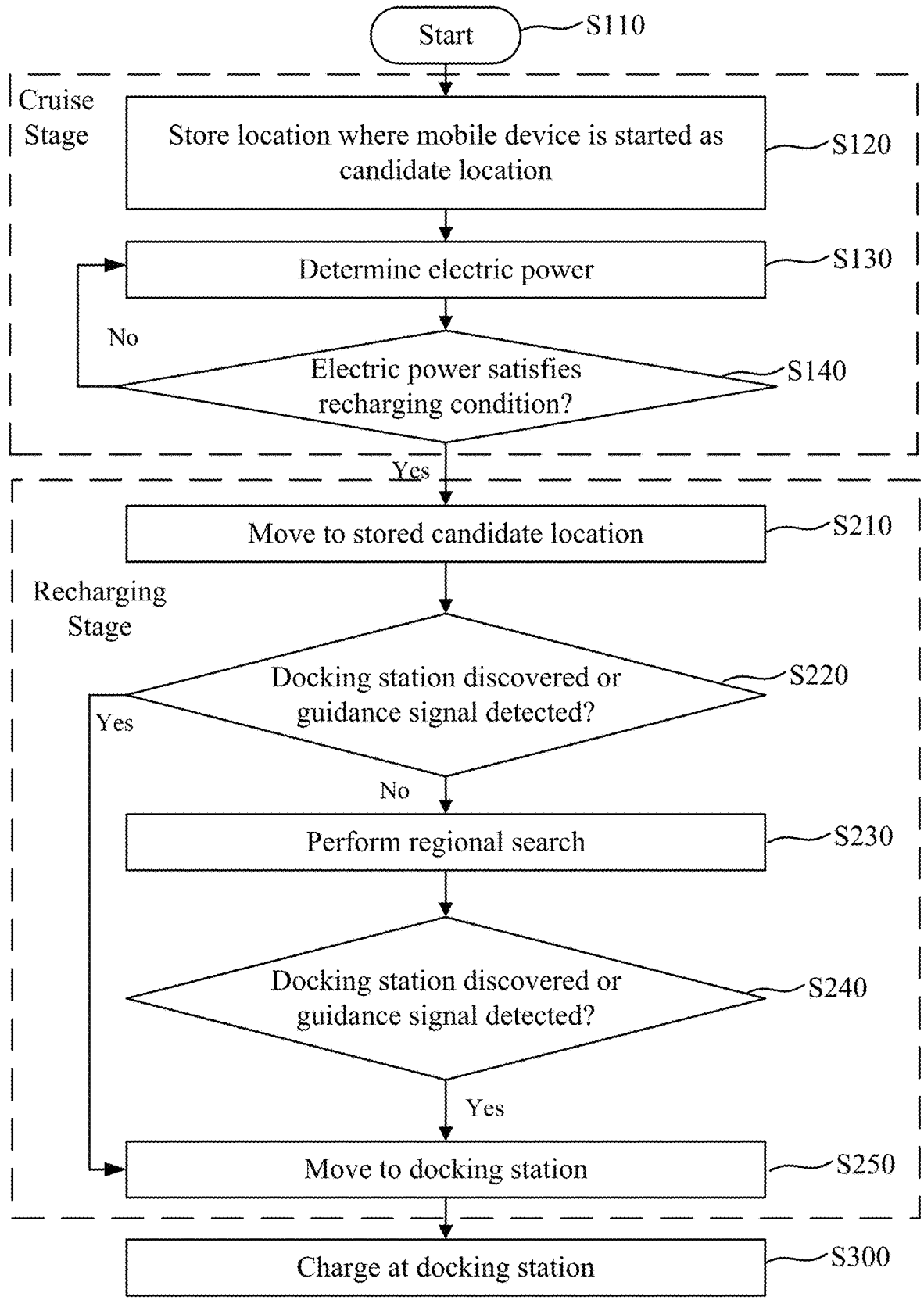
FIG. 2A is a flowchart illustrating a docking method for a mobile device, according to an embodiment of the present disclosure.
Figure 4A:
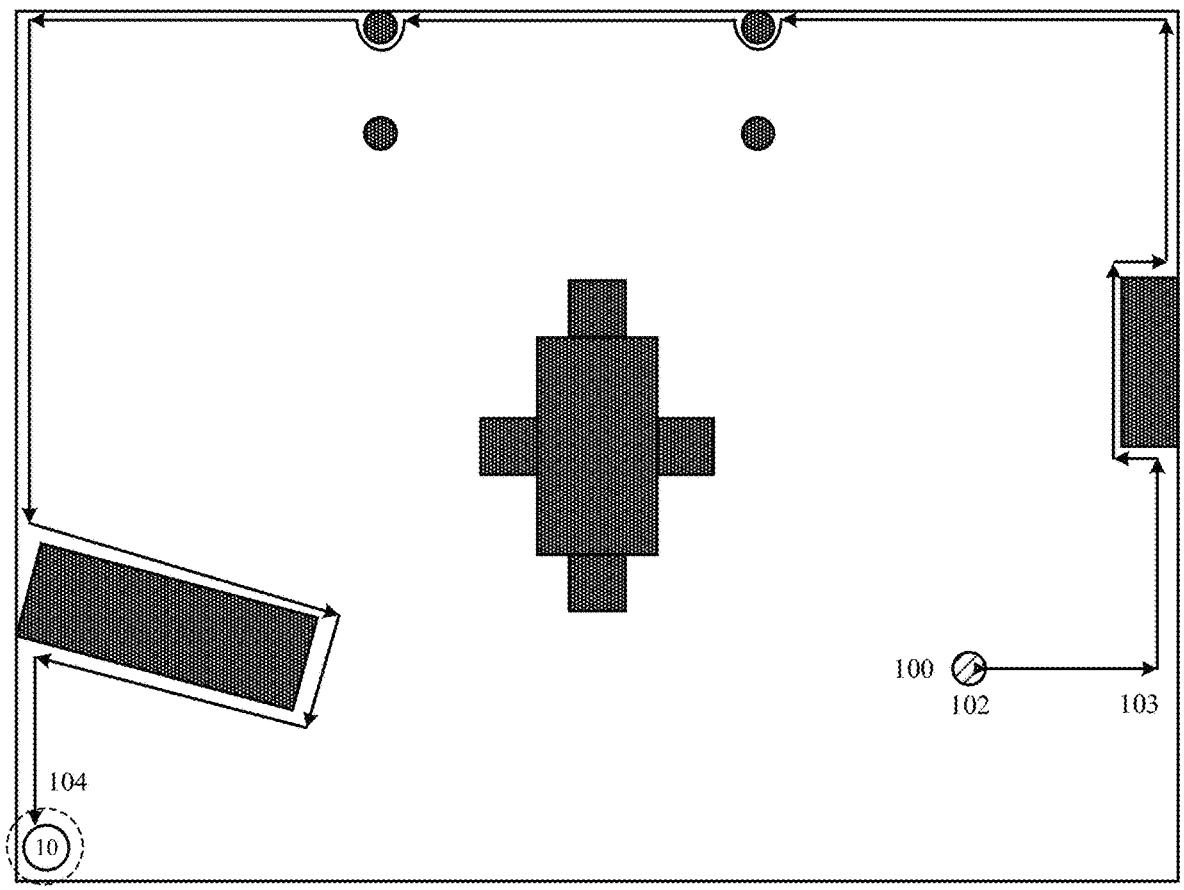
FIG. 4A is a schematic illustration of a regional search, according to an embodiment of the present disclosure.
Figure 4B:
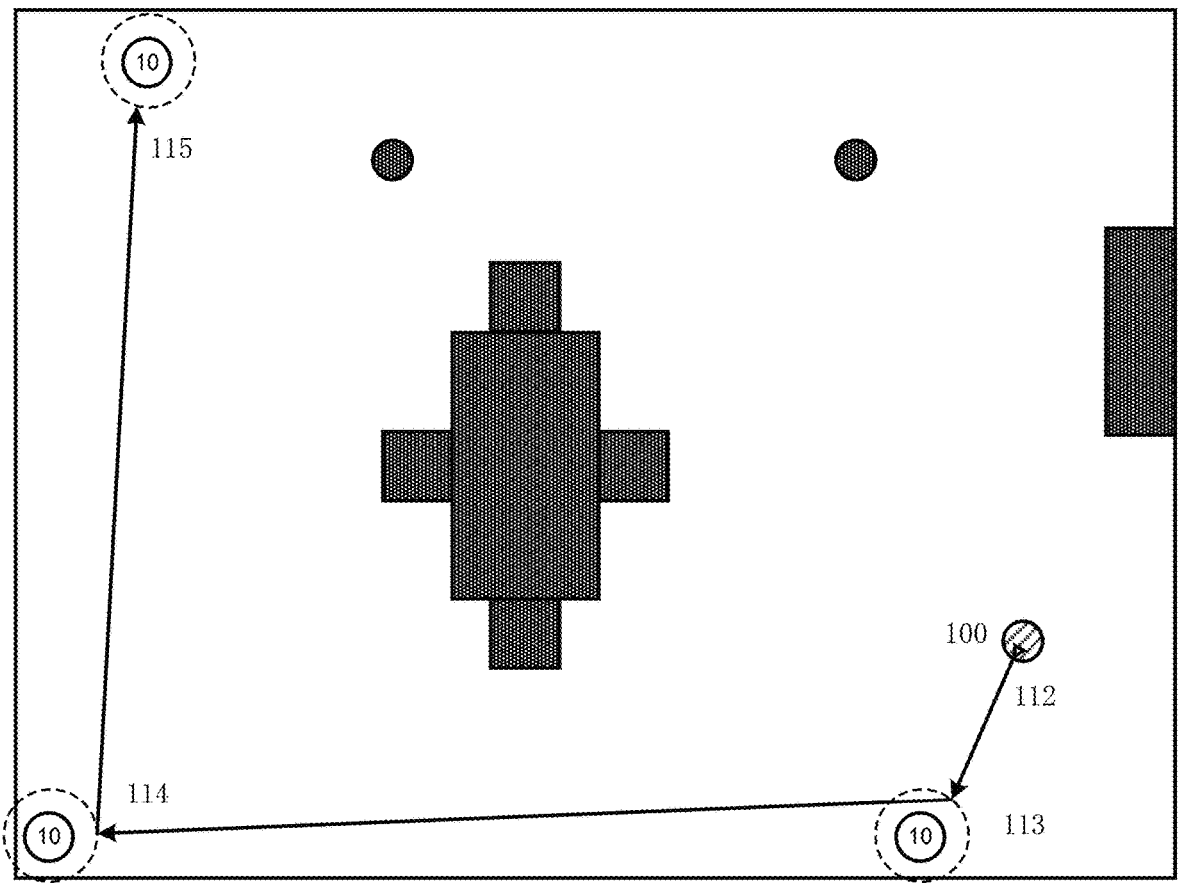
FIG. 4B is a schematic illustration of a regional search, according to an embodiment of the present disclosure.
Figure 4C:
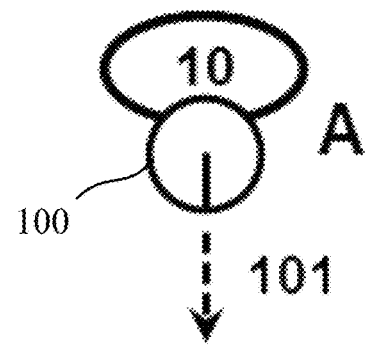
FIG. 4C is a schematic illustration of a motion of the mobile device, according to an embodiment of the present disclosure.

FIG. 2A is a flowchart illustrating a docking method executable by the mobile device 100 when the mobile device 100 is started (e.g., powered on) at a docking station, as shown in FIG. 4C. The docking method for the mobile device 100 according to this embodiment may include:

Step S110: the mobile device 100 may be started at a docking station 10.

Step S120: the mobile device 100 may store a location when the mobile device 100 is started (for example, the initial location A of the docking station 10 as shown in FIG. 4C) as a candidate location; then, the mobile device 100 may depart from the docking station 10 to execute a predetermined task.

The predetermined task refers to the primary function and/or the auxiliary function the mobile device 100 is configured to execute. For example, for a cleaning robot, the predetermined task may include cleaning a room, playing an audio file, etc. For a logistics robot, the predetermined task may include moving cargos according to a plan or schedule. For a service type robot, the predetermined task may include performing relevant services, etc.

Step S130: the mobile device 100 may determine an electric power. The electric power refers to the remaining electric power of a battery of the mobile device 100.

Step S140: the mobile device 100 may determine whether the electric power satisfies a recharging condition.

The recharging condition may be configured in various forms. For example, the recharging condition may be configured as: when the electric power is lower than a predetermined electric power threshold or a predetermined electric power percentage threshold, or the running time or running mileage has reached a predetermined running time (or running time percentage) or running mileage threshold (or running mileage percentage), or any other parameter that can quantify the remaining electric power or a relationship between the remaining electric power and remaining mileage or time has satisfied a predetermined condition. In the present disclosure, the mobile device satisfying the recharging condition is regarded as a mobile device to be charged. In some embodiments, the mobile device to be charged may include recharging as a current task to be executed.

Step S130 and step S140 may be performed by the mobile device 100 according to a predetermined time interval, or in real time. That is, the determination of the electric power and the determination of whether the recharging condition is satisfied may be performed according to a predetermined time interval, or in real time. In some embodiments, the determination of the electric power and the determination of whether the recharging condition is satisfied may be performed when another predetermined condition is satisfied (e.g., after detecting a stored candidate location and/or after detecting a signal sensing location). A person having ordinary skills in the art can appreciate that the present disclosure is not limited by the timing and manner of performing steps S130 and S140 to determine the electric power. In addition, the present disclosure is not limited by the order, timing, triggering condition, and number of times associated with executing steps S130 and S140 and other functions and/or steps performed by the mobile device 100, or any combination thereof.

A person having ordinary skills in the art can appreciate that step S120 and steps S130 and S140 can be executed in any suitable order. For example, step S120 may be executed before steps S130 and S140, or steps S130 and S140 may be executed before step S120. In some embodiments, step S120 may be executed simultaneously with steps S130 and S140. A person having ordinary skills in the art can understand that the determination relating to the electric power in steps S130 and S140 may be executed independent of other primary functions or auxiliary functions of the mobile device 100, or independent of other functions of the mobile device 100, such as storing candidate location information, detecting guidance signals, and/or storing signal sensing locations. The present disclosure is not limited to the order in which the steps S130 and S140 are executed. As such, the present disclosure is not limited by the order in which steps S130 and S140 are performed relative to other steps.

In some embodiments, each step after step S110 may be performed while the mobile device 100 is performing a normal predetermined task. The steps after step S110 may be categorized as steps of a "cruise stage," as shown in the upper dashed box in FIG. 2A.

Step S210: based on a determination that the electric power of the mobile device 100 satisfies the recharging condition, the mobile device 100 to be charged may move or navigate to a stored candidate location or a nearby location of the stored candidate location.

Step S220: the mobile device 100 may search for a guidance signal transmitted by the docking station 10 and/or search for the docking station 10 when the mobile device 100 arrives at the candidate location or the nearby location of the candidate location, and/or during the process of moving to the candidate location or the nearby location of the candidate location. Based on a determination that the docking station 10 is discovered ("Yes," step S220) (for example, the docking station 10 may be discovered directly through a proximity sensor or a camera of the mobile device 100), then the mobile device 100 may directly move to the docking station 10 (step S250) to perform charging (step S300). Alternatively, based on a determination that the guidance signal is detected, the mobile device 100 may move to the docking station 10 under the guidance of the guidance signal (step S250) to perform charging (step S300). Otherwise, based on a determination that the docking station 10 is not discovered or the guidance signal is not detected ("No," step S220), step S230 may be performed.

Step S230: based on a determination that the docking station 10 is not discovered, and/or the guidance signal transmitted by the docking station 10 is not detected at the candidate location or the nearby location of the candidate location, the mobile device 100 may perform a regional search to search for the guidance signal and/or the docking station 10.

Step S240: the mobile device 100 may determine whether the docking station 10 is discovered or whether the guidance signal is detected. Based on a determination that the docking station 10 is discovered during the regional search, the mobile device 100 directly move to the docking station 10; based on a determination that the guidance signal is detected, the mobile device 100 may move to the docking station 10 under the guidance of the guidance signal.

Step S300: the mobile device 100 may perform charging at the docking station 10.

Figure 2B:
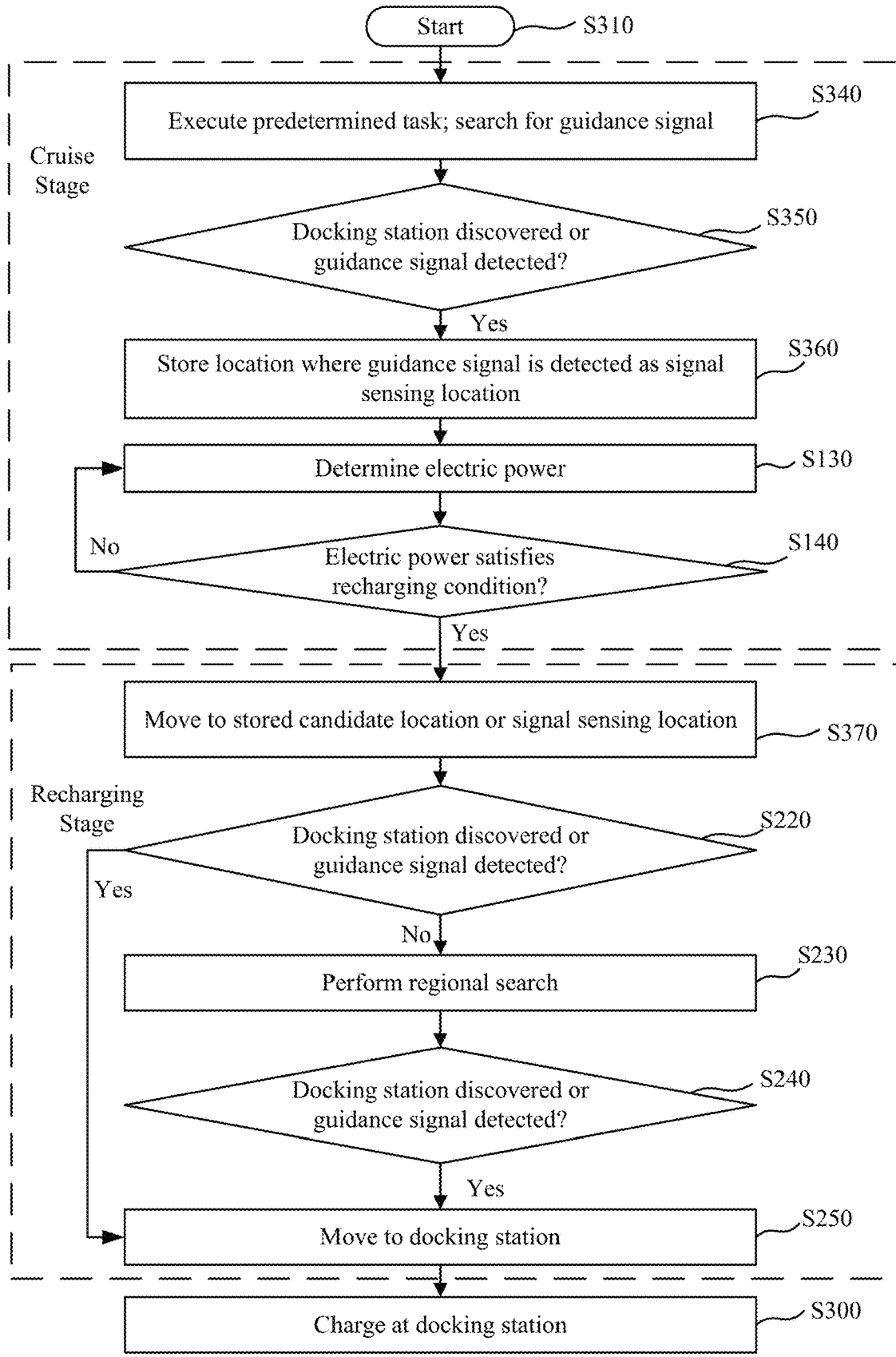
FIG. 2B is a flowchart illustrating a docking method for a mobile device, according to an embodiment of the present disclosure.

In some embodiments, the initial location of the mobile device 100 where the mobile device 100 is started may not be at the docking station 10. FIG. 2B is a flowchart showing a docking method for the mobile device 100 when the initial location is not at the docking station 10. In such an embodiment, the mobile device 100 may be started at any location other than the docking station 10. The docking method for the mobile device 100 may include:

Step S310: the mobile device 100 may be started at any location other than the docking station 10.

Step S340: the mobile device 100 may execute a predetermined task, and search for a guidance signal transmitted by the docking station 10.

The search for the guidance signal may be performed by the mobile device 100 simultaneously during the entire process of performing the predetermined task, or during a predetermined time period, or may be performed sequentially with the predetermined task. For example, the mobile device 100 may perform the predetermined task during a first time period t1, and may search for the guidance signal during a second time period t2. The mobile device 100 may perform the predetermined task and the search for the guidance signal in any suitable sequence or order.

A person having ordinary skills in the art can appreciate, that the search for the guidance signal may be performed by the mobile device 100 independent of other primary functions and auxiliary functions performed by the mobile device 100, such as storing the candidate location information, storing the signal sensing location, determining the electric power, etc. The present disclosure does not limit the sequence (or order), timing, triggering condition, and number of times of performing the search for the guidance signal. Thus, the present disclosure is not limited by the sequence, timing, triggering condition, and number of times the search for the guidance signal and other functions or any combination thereof are performed by the mobile device 100. This applies to any step of "searching for the guidance signal" disclosed herein, unless there is a conflict in logic.

Step S350: the mobile device 100 may determine whether the docking station 10 is discovered or whether the guidance signal transmitted by the docking station 10 is detected.

Figures 4D, 4E:
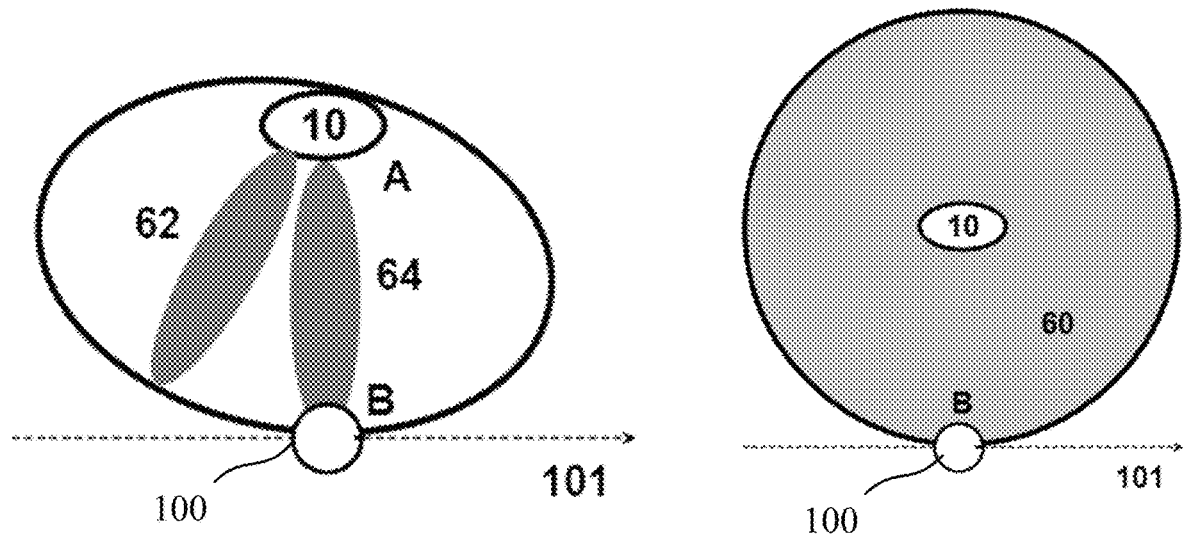
FIG. 4D is a schematic illustration of a motion of the mobile device, according to an embodiment of the present disclosure.
FIG. 4E is a schematic illustration of a motion of the mobile device, according to an embodiment of the present disclosure.

Step S360: based on a determination that the docking station 10 is discovered or the guidance signal transmitted by the docking station 10 is detected, the mobile device 100 may store the location of the mobile device 100 where the guidance signal is detected as the signal sensing location. As shown in FIG. 4D and FIG. 4E, when the mobile device 100 moves in a direction 101, the mobile device 100 may detect a guidance signal 62 and/or 64 at a location B, as shown in FIG. 4D, or the mobile device 100 may detect a guidance signal 60 at the location B, as shown in FIG. 4E. Then, the location B of the mobile device 100 as shown in FIG. 4D or FIG. 4E may be stored by the mobile device 100 as the signal sensing location.

Step S130: the mobile device 100 may determine the electric power.

Step S140: the mobile device 100 may determine whether the electric power satisfies the recharging condition. In some embodiments, the mobile device that satisfies the recharging condition may be referred to as a mobile device to be charged. The mobile device having recharging as the primary task to be executed may be referred to as a mobile device to be charged. The steps S130 and S140 for determining the electric power and for determining whether the electric power satisfies the recharging condition have been described above.

Each step after the step S310 shown in FIG. 2B may be executed simultaneously with the normal predetermined task that the mobile device 100 is configured to perform. Thus, the steps S310, S350, S360, S130, and S140 may be categorized as steps of a "cruise stage," as shown by the upper dashed box shown in FIG. 2B.

Step S370: based on a determination that the mobile device 100 satisfies the recharging condition, the mobile device 100 to be charged may move or navigate to the stored signal sensing location or a nearby location of the signal sensing location.

Step S220: the mobile device 100 may search for the docking station 10 or the guidance signal transmitted by the docking station 10 when the mobile device 100 moves to the signal sensing location or the nearby location, or during the process of moving to the signal sensing location or the nearby location thereof. The mobile device 100 may determine whether the docking station 10 is discovered or the guidance signal is detected. Based on a determination that the docking station 10 is discovered (e.g., the docking station 10 may be directly discovered through a proximity sensor or a camera) ("Yes," step S220), the mobile device 100 may directly move to the docking station 10 (step S250) to perform charging (step S300). Based on a determination that the guidance signal is detected, the mobile device 100 may move to the docking station 10 under the guidance of the guidance signal to perform the charging. Otherwise, based on a determination that the docking station 10 is not discovered or the guidance signal is not detected ("No," step S220), the mobile device 100 may perform step S230.

Step S230: based on a determination that the docking station 10 is not discovered or the guidance signal is not detected at the signal sensing location or the nearby location thereof, the mobile device 100 may perform a regional search to search for the docking station 10 and/or the guidance signal.

Step S240: based on a determination that the docking station 10 is discovered during the regional search ("Yes," step S240), the mobile device 100 may move directly to the docking station 10 (step S250) to perform charging (step S300); alternatively, based on a determination that the guidance signal is detected, the mobile device 100 may move to the docking station 10 under the guidance of the guidance signal.

Step S300: the mobile device 100 may perform charging at the docking station 10.

It should be noted that the candidate location of the docking station 10 may be a location where the docking station 10 is located. A signal coverage zone of the docking station 10 may refer to an area or space in which the guidance signal of the docking station 10 may be detected by the mobile device 100. Because the guidance signal typically covers the location of the docking station 10, the signal coverage zone of the docking station 10 typically covers the candidate location. The shape of the signal coverage zone may be a circle, an oval, or any other suitable shapes that may be formed by the ranges of the guidance signal. For example, in the embodiment shown in FIG. 3B, the guidance signals 62 and 64 transmitted by a transmitter 20 of the docking station 10 may be directional signals, which may form an oval-shaped coverage zone, as shown in FIG. 4D. Based on a determination that the electric power of the mobile device 100 is sufficient when executing the predetermined task, the mobile device 100 may determine that no charging is needed. This stage may be referred to as the "cruise stage." As long as the mobile device 100 is at any location within the signal coverage zone, the mobile device 100 may detect the guidance signal 62 or 64, thereby knowing that the docking station 10 is within a relatively small area around the current location of the mobile device 100, without having to determine the actual precise location of the docking station 10. Therefore, the current location of the mobile device 100 where the mobile device 100 detects the guidance signal may be stored as the signal sensing location. According to the above definition of the "signal coverage zone," the "signal sensing location" is located within the "signal coverage zone," and any location where the guidance signal is not detectable is not within the signal coverage zone, i.e., is not the "signal sensing location." Accordingly, the "signal coverage zone" may be regarded as a set formed by "signal sensing locations."

The mobile device 100 may monitor the remaining electric power in real time or periodically based on a predetermined interval. When the electric power is low, e.g., when the electric power is lower than a low electric power threshold of 10%, the mobile device 100 may need to be recharged. This stage may be referred to as the "recharging stage." The mobile device 100 may move to a signal sensing location stored in the mobile device 100 at the "cruise stage," i.e., to be within the stored signal coverage zone. Based on a determination that the guidance signal 62 or 64 is detected again at the signal sensing location, the mobile device 100 may move to the docking station 10 under the guidance of the guidance signal to perform charging.

Figure 3A:
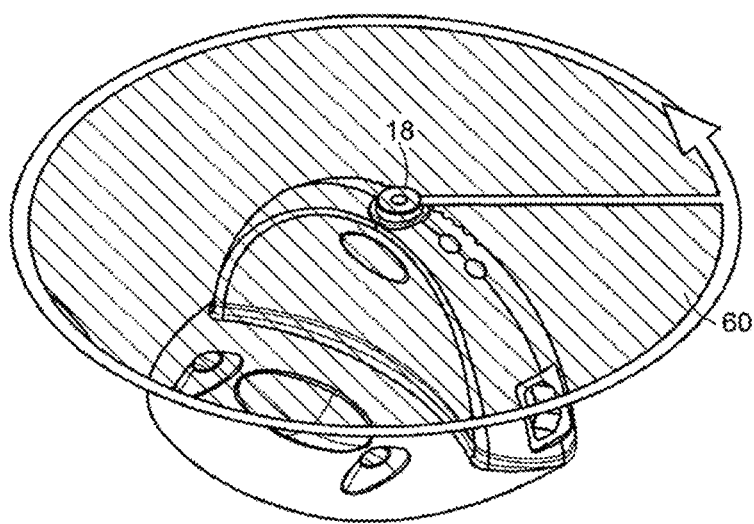
FIG. 3A is a schematic illustration of a docking station and a guidance signal transmitted by the docking station, according to an embodiment of the present disclosure.

When the guidance signal is an omnidirectional signal 60, as shown in FIG. 3A, the signal coverage zone of the guidance signal may be the circular shaded zone shown in FIG. 4E. Because the omnidirectional signal does not have directionality, when the mobile device 100 moves to a location within the signal coverage zone, and detects the guidance signal, the mobile device 100 may still not be able to determine the specific direction of the docking station 10. To solve this issue, during the movement (or navigation) of the mobile device 100, the mobile device 100 may compare the strengths of the guidance signals detected at two consecutive time instances to determine whether the mobile device 100 is moving toward or away from the docking station 10. With this determination, the mobile device 100 can keep moving toward the docking station 10 until the mobile device 100 reaches the docking station 10. At the docking station 10, the mobile device 100 may perform the charging.

Figure 4F:
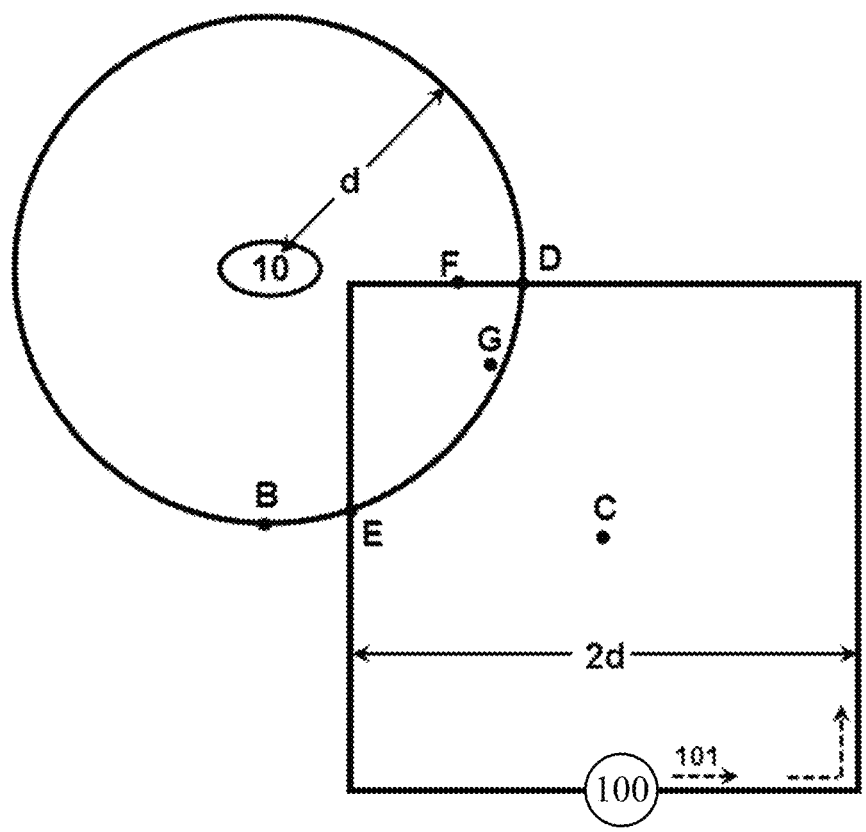
FIG. 4F is a schematic illustration of a regional search, according to an embodiment of the present disclosure.

An example of this process is illustrated in FIG. 4F. At a first time instance t1 (at location D), after the mobile device 100 detects the guidance signal, the mobile device 100 may record the strength of the guidance signal detected at the first time instance t1 as SI1. During subsequent movements, when the mobile device 100 moves to a location F at a second time instance t2, the mobile device 100 may record the strength of the guidance signal as SI2. Because the location F is relatively closer to the docking station 10 than the location D, the strength SI2 is stronger than the strength SI1. Thus, the mobile device 100 may use the location F as the new signal sensing location to replace the signal sensing location D stored at the first time instance t1. During subsequent movements, for example, when the mobile device 100 moves to a location G at a third time instance t3, the mobile device 100 may record the strength of the guidance signal as SI3. Because the location G is relatively farther away from the docking station 10 than the location F, the strength SI3 of the guidance signal may be weaker than the strength SI2. Thus, the mobile device 100 may not store the location G at the third time instance t3. Instead, the mobile device 100 may still use the location F as the signal sensing location. Thus, not every signal sensing location may be stored by the mobile device 100. For example, the location G may not be stored. According to the above described method, the mobile device 100 may gradually move closer to the docking station 10 to accomplish recharging successfully.

Figure 2C:
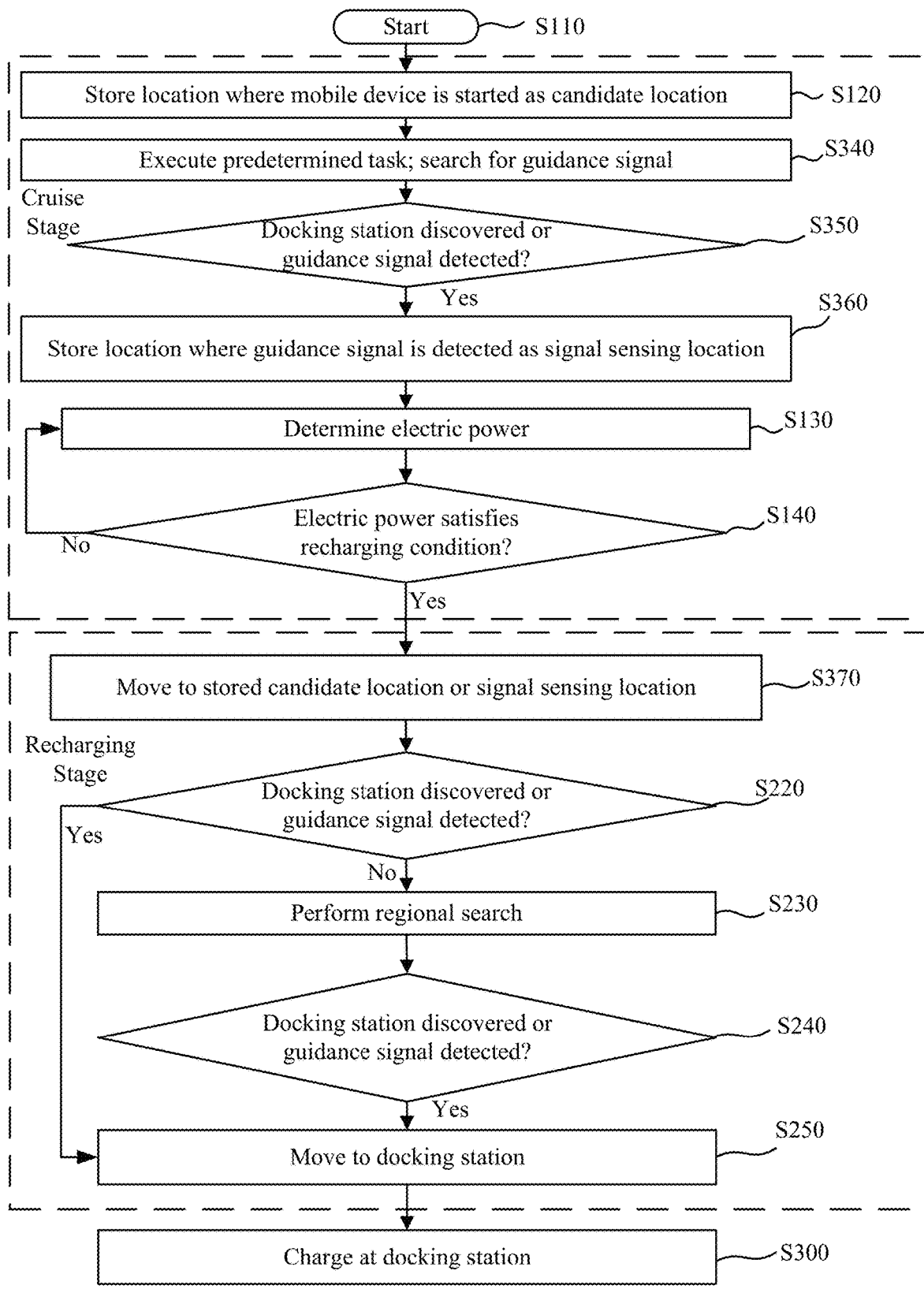
FIG. 2C is a flowchart illustrating a docking method for a mobile device, according to an embodiment of the present disclosure.
Figure 2D:
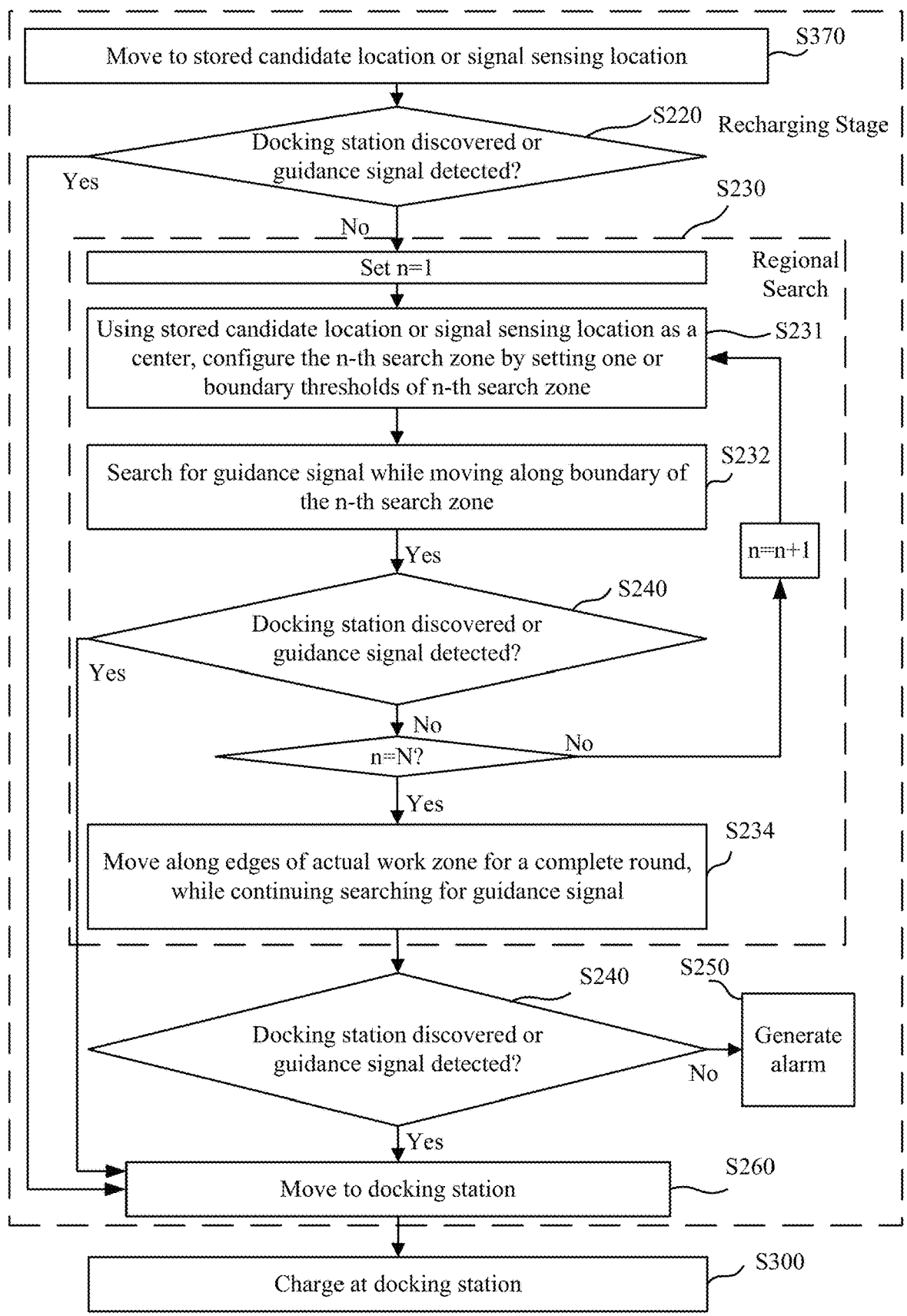
FIG. 2D is a flowchart illustrating a regional search of the docking method for a mobile device, according to an embodiment of the present disclosure.

In some embodiments, the above-described embodiments shown in FIG. 2A and FIG. 2B may be combined. As shown in the flowchart of FIG. 2C, the docking method for the mobile device 100 may include:

Step S110: the mobile device 100 may be started at the docking station 10, as shown in FIG. 4C.

Step S120, the mobile device 100 may store the location where the mobile device 100 is started (e.g., the location A shown in FIG. 4C) as the candidate location.

Step S340: the mobile device 100 may execute a predetermined task, and search for the guidance signal transmitted by the docking station 10.

Step S350: the mobile device 100 may determine whether the docking station 10 is discovered or the guidance signal is detected. Based on a determination that the mobile device 100 detects the guidance signal transmitted by the docking station 10, the mobile device 100 may store the location where the guidance signal is detected as the signal sensing location (step S360). The signal sensing location may be the location B shown in FIG. 4D or FIG. 4E.

When the mobile device 100 is started at the docking station 10, in a typical situation, the mobile device 100 can detect the guidance signal. In some embodiments, the mobile device 100 may store multiple signal sensing locations, or may store only one signal sensing location, which may be the last location where the guidance signal is detected or the location where the detected strength of the guidance signal is the strongest.

Step S130: the mobile device 100 may determine the electric power.

Step S140: the mobile device 100 may determine whether the electric power satisfies a predetermined recharging condition. In some embodiments, the mobile device 100 satisfying the recharging condition may be referred to as the mobile device 100 to be charged. In some embodiments, the mobile device 100 with the recharging being the primary task to be executed may be referred to as the mobile device 100 to be charged. Descriptions of the determination of the electric power and the determination of whether the recharging condition is satisfied can refer to the above descriptions.

Each step after the step S110 may be executed simultaneously with the normal predetermined task. Thus, the steps S120, S340, S350, S360, S130, and S140 may be categorized as steps of the "cruise stage," as indicated by the dashed box in FIG. 4A.

Step S210: based on a determination that the electric power of the mobile device 100 satisfies the recharging condition, the mobile device 100 may move (or navigate) to a stored candidate location, and/or a signal sensing location, and/or a nearby location of the stored candidate location or the signal sensing location. These locations may be collectively referred to as a target location. The target location may include: a candidate location, a signal sensing location, and/or a docking station discovering location. The target location may also include a nearby location associated with the candidate location, the signal sensing location, and/or the docking station discovering location.

Step S220: when the mobile device 100 has moved to the target location, and/or during the process of moving to the target location, the mobile device 100 may search for the guidance signal transmitted by the docking station 10 and/or the docking station 10. The guidance signal and the docking station 10 may be collectively referred to as a target. The target may include: the docking station 10, and/or the guidance signal transmitted by the docking station 10. Based on a determination that the docking station 10 is discovered (e.g., the docking station 10 is detected through a proximity sensor or a camera), the mobile device 100 may directly move to the docking station 10 to perform the charging. Based on a determination that the mobile device 100 detects the guidance signal, the mobile device 100 may move to the docking station 10 under the guidance of the guidance signal to perform the charging. Otherwise, based on a determination that the docking station 10 is not discovered or the guidance signal is not detected, the mobile device 100 may perform step S230.

Step S230: based on a determination that the target is not detected at the target location, the mobile device 100 may perform a regional search to search for the target.

Step S240: the mobile device 100 may determine whether the docking station 10 is discovered or whether the guidance signal is detected during the regional search. Based on a determination that the docking station 10 is discovered during the regional search, the mobile device 100 may directly move to the docking station 10 (step S250). Based on a determination that the guidance signal is detected during the regional search, the mobile device 100 may move to the docking station 10 under the guidance of the guidance signal (step S250).

Step S300: the mobile device 100 may perform charging at the docking station 10.

Comparing the embodiments shown in FIG. 2A, FIG. 2B, and FIG. 2C, the steps labelled with the same reference number have the same content. The difference between the embodiments may lie in whether the stored location is a candidate location or a signal sensing location. These locations may be collectively referred to as the "target location." That is, the "target location" may be the candidate location of the docking station stored by the mobile device 100 when the mobile device 100 is started as the docking station 10, or the candidate location of the docking station 10 encountered and stored by the mobile device 100 during operations. The "target location" may also be the signal sensing location where the mobile device 100 detects the guidance signal during movement. The "target location" may also be a docking station discovering location stored by the mobile device 100, where the mobile device 100 previously discovered the docking station.

In the above descriptions, the mobile device 100 is described as being configured to sense or detect the guidance signal by itself, such as through the receiver 181. In some embodiments, coordinates of the docking station 10 may be input into the mobile device 100 manually by a user or through other devices, and stored by the mobile device 100 as a candidate location. For example, the other devices may be an input/output ("IO") device of the mobile device 100, such as a functional button or touch screen. A user or another device may input location information relating to the current location of the docking station 10 into the mobile device 100. After receiving the location information, the mobile device 100 may store the location information as the candidate location of the docking station 10. For example, the user may input into the mobile device 100 the coordinate locations of the docking station 10 in a mobile device coordinate system, or the user may plan and select the location of the docking station 10 in a map displayed on an input/output ("IO") device of the mobile device 100 or the IO device of the docking station 10. Alternatively, the user may plan and select the location of the docking station 10 in a map displayed on a smart terminal (e.g., a personal computer, a tablet, or a smart phone, etc.) connected with the mobile device 100. A candidate location selected or determined through any suitable manner may be stored as the candidate location of the docking station 10.

Figure 3B:
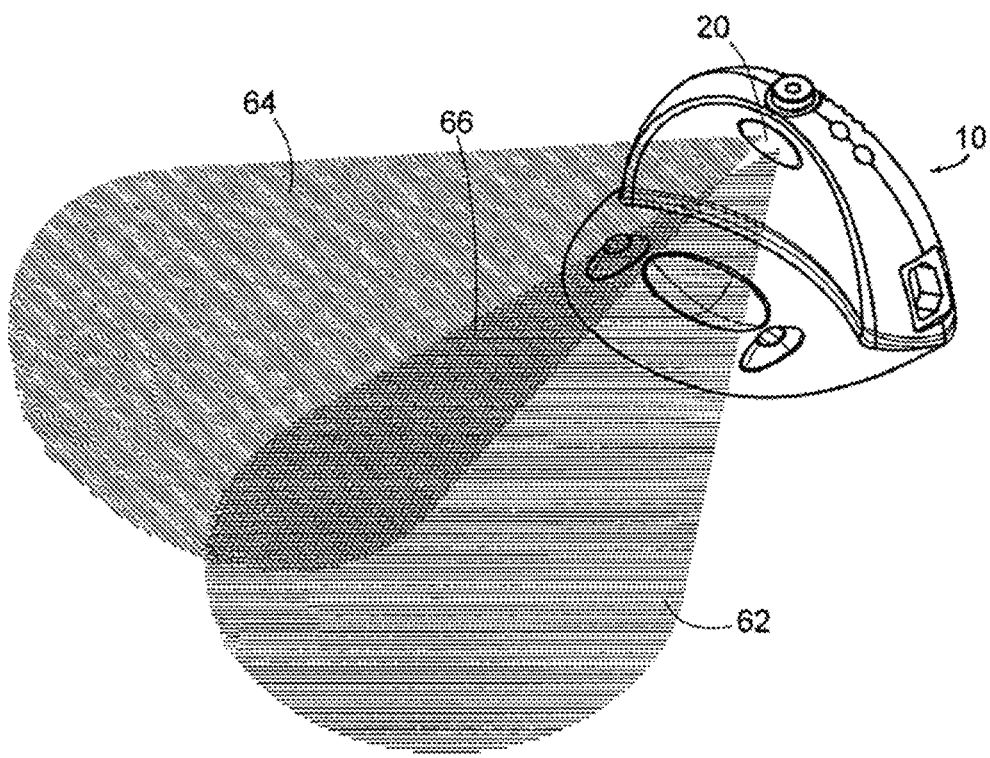
FIG. 3B is a schematic illustration of a docking station and a guidance signal transmitted by the docking station, according to an embodiment of the present disclosure.

In some embodiments, the guidance signal may be the omnidirectional signal 60 transmitted by a signal transmitter 18 of the docking station 10, as shown in FIG. 3A, FIG. 4E. Alternatively, the guidance signal may be the directional signals 62, 64 transmitted by the signal transmitter 20 of the docking station 10, as shown in FIG. 3B, FIG. 4D. The guidance signal may be at least one signal, such as two or more signals. For example, FIG. 3B shows two guidance signals 62 and 64, which have an overlapping coverage zone 66. In some embodiments, the signal corresponding to the overlapping coverage zone 66 may be referred to as a third guidance signal. In some embodiments, the recharging technical solutions for the mobile device disclosed herein may be used in combination with other conditions or situations to further improve the practicality and efficiency of the recharging of the mobile device. For example, both of the omnidirectional signal 60 and the directional signals 62 and 64 may be configured in the docking station 10. At least two levels of electric power thresholds, including a high electric power threshold and a low electric power threshold, may be set. Based on a determination that the electric power of the mobile device 100 is higher than or equal to the high electric power threshold, the mobile device 100 may be configured to store, as a signal sensing location associated with the docking station 10, a location where the mobile device 100 detects the guidance signal 60, 62, or 64 while executing a predetermined task docking station (i.e., the "cruise stage"). Based on a determination that the electric power of the mobile device 100 is lower than the high electric power threshold but higher than the low electric power threshold, the mobile device 100 may search for the guidance signal while executing the predetermined task. Based on a determination that the guidance signal is detected, the mobile device 100 may move to the docking station 10 under the guidance of the guidance signal to perform the charging (i.e., the mobile device 100 not only performs the predetermined task, but also performs recharging if the guidance signal is detected. This stage belongs to an overlap between the "cruise stage" and the "recharging stage"). Based on a determination that the electric power of the mobile device 100 is lower than the low electric power threshold, the mobile device 100 may terminate the execution of the predetermined task, and may be fully committed to searching for the guidance signal 60, 62, or 64, such that the mobile device 100 can be recharged as soon as possible (i.e., the "recharging stage"). This embodiment still includes the "cruise stage" and the "recharging stage." It is noted that the above descriptions of the embodiments are only for the purpose of explaining the technical solutions of the present disclosure. Actual implementations of the technical solutions of the present disclosure may be in any suitable form. For example, a simple form of implementation may include: the docking station 10 transmits a single omnidirectional signal or a directional signal to guide the mobile device 100 to move to the docking station 10 to perform the charging. In some embodiments, when the mobile device 100 includes or carries a camera or a laser-based distance measuring device, a rough or precise location of the docking station 10 may be determined through simultaneous location and mapping ("SLAM") methods based on images captured by the camera, or directly determined through the laser-based distance measuring device. Then, the candidate location of the docking station 10 may be determined by the mobile device 100, or the signal coverage zone may be determined by the mobile device 100.

In some embodiments, the candidate location of the docking station 10 stored in the mobile device 100 may be only one location. In some embodiments, the actual location of the docking station 10 may be changed. Thus, the actual location of the docking station 10 may be different from the stored candidate location, or may not be within the signal coverage zone. For example, a person may move or accidentally knock the docking station 10 away from its original location, resulting in a relatively large change in the location of the docking station 10. As another example, other devices of the user may need to be charged from a power outlet currently used by the docking station 10. Thus, the power cord of the docking station 10 may be unplugged from the power outlet, the docking station 10 may be moved to another place, and re-plugged into another power outlet to receive power. When the actual location of the docking station 10 is different from the candidate location stored by a mobile device, and is not within the signal coverage zone, in the conventional technology, because the candidate location of the docking station stored in the mobile device is not changed, the mobile device may fail to perform charging, and the charging failure rate may be high.

Furthermore, positioning errors may exit in the mobile device. For example, due to the accumulative errors of the encoder wheel and/or the inertial measurement unit ("IMU"), even if the location of the docking station 10 has not been changed, the mobile device may erroneously determine that the location of the docking station 10 has been reached due to the accumulative errors of the mobile device, when the actual location of the docking station 10 has not been reached. Such errors may cause the "actual location" (including the influence of the accumulative errors) of the docking station 10 determined by the mobile device to be different from the candidate location stored in the mobile device, or may cause the "actual location" to be outside of the signal coverage zone, which may result in failure in the recharging of the mobile device.

To resolve the problems associated with the conventional technology, the present disclosure provides a regional search for the candidate location of the docking station 10 or the signal sensing location within the signal coverage zone.

According to an embodiment of the present disclosure, it is presumed that the effective receiving range of the guidance signal of the docking station 10 is d (as shown in FIG. 4F as the radius d; the signal coverage zone shown in the embodiment of FIG. 4F is within a circular area having a center that is the location of the docking station 10, and a radius that is the effective receiving range d of the guidance signal). The effective receiving range of the guidance signal refers to the maximum distance at which the guidance signal may be detected by the mobile device 100, such as the distance between the docking station 10 and the location B shown in FIG. 4D or FIG. 4E. If the mobile device 100 is to be charged, i.e., if the mobile device 100 is at the "recharging stage" (which may include steps S210 to S240 in the embodiments shown in FIGS. 2A-2C), the mobile device 100 to be charged may move (or navigate) to the stored candidate location (e.g., the location A shown in FIG. 4C) and/or the signal sensing location (e.g., the location B shown in FIG. 4E), and/or the corresponding nearby location thereof (collectively referred to as the "target location"). In some embodiments, the "target location" may include: the candidate location, the docking station discovering location, and/or the signal sensing location, and/or the nearby location corresponding to the candidate location, the docking station discovering location, and/or the signal sensing location. That is, the mobile device 100 may navigate to locations within the signal coverage zone (e.g., a circular zone that has the location of the docking station 10 as the center, and the effective receiving range d as the radius, and the circumference of which passing through the location B, as shown in FIG. 4F).

In some embodiments, the regional search in the "recharging stage" is performed after step S220. That is, based on a determination that the docking station 10 has not been discovered or the guidance signal has not been detected when the mobile device 100 has moved to the candidate location (as in the embodiment of FIG. 2A or FIG. 2C), and/or the signal sensing location (as in the embodiment of FIG. 2B or FIG. 2C), and/or at the nearby location corresponding to the candidate location or the signal sensing location, or during the process of moving to such locations, the mobile device 100 may perform the regional search of step S230. Step S230 may be overlapping with other steps in other embodiments, or may be the same as other steps in other embodiments. A person having ordinary skills in the art would appreciate that the regional search is a step in the entire docking method, and is not limited by other steps in other embodiments. The method shown in FIG. 2D may include:

Step S231: using the stored candidate location or signal sensing location as a center, the mobile device 100 may configure the n-th search zone by setting one or more boundary thresholds of the n-th search zone.

The "search zone" of the present disclosure refers to a search zone or space of the regional search, unless otherwise noted. The search zone may have any closed shape, such as a circular shape, a square shape, a rectangular shape, a rhombus shape, an oval shape, a triangular shape, etc., or may be a combination of any of these shapes. In some embodiments, the search zone may have an irregular shape. For example, the candidate location A shown in FIG. 4C or the signal sensing location B shown in FIG. 4D or FIG. 4E may be used as a center, the effective receiving range d of the guidance signal may be used as the radius to form a circular zone as the search zone. In some embodiments, the search zone may be a square search region having an edge length of 2 d. The radius d may be the boundary threshold for the circular search zone, and the edge length 2 d may be the boundary threshold of the square search zone. The one or more boundary thresholds may be pre-configured by the mobile device 100, or may be set by a user. For a circular search zone, the boundary threshold may be represented by the diameter or the radius of the circular shape. For a square search zone, the boundary threshold may be represented by the edge length of the square or the diagonal length of the square. For an oval shaped search zone, the boundary thresholds may be represented by the long axis and the short axis. For a rectangular search zone, the boundary thresholds may be represented by the length and width, or by the length or width and the diagonal length. For search zones of the same shape, the respective boundary thresholds may be represented in any suitable forms, as long as the forms can be determined and can adequately represent the search zone. In the present disclosure, a square search zone is used as an example. The edge length of the square is set as the boundary threshold for representing the square shaped search zone, as shown in FIG. 4F.

The above search zone may also be referred to as a basic search zone or a first search zone.

The boundary threshold may be smaller than or greater than the effective receiving range d (d>0) of the guidance signal transmitted by the docking station 10. In some embodiments, the boundary threshold may be set as a predetermined number of times of the effective receiving range d of the guidance signal of the docking station 10, such as 1.5 d, 2 d, 4 d, etc. A search zone configured in such a manner may be a circular search zone having a diameter of 1.5 d, 2 d, 4 d, etc., or a square search zone having an edge length or diagonal length of 1.5 d, 2 d, 4 d, etc.

For different types or models of mobile devices, the effective receiving ranges of the corresponding docking stations may be different. In some embodiments, in the actual work zone of the mobile device, there may be multiple compatible docking stations that can charge the same mobile device. The boundary threshold may be configured using the shortest effective receiving range of the multiple docking stations as the base value d. For example, the effective receiving ranges of three docking stations of a same mobile device may be d1=1 meter, d2=2 meters, and d3=4 meters. The shortest effective receiving range d1=1 meter may be selected as the boundary threshold. Other suitable configurations may also be used. A person having ordinary skills in the art can appreciate that the setting of the one or more boundary thresholds is merely an adjustment of parameters. The present disclosure is not limited by the manner in which the one or more boundary thresholds are set, or limited by the setting of the effective receiving range d of the guidance signal.

Step S232: the mobile device 100 may search for the guidance signal and/or the docking station 10 while moving along the boundary of the n-th search zone.

When the mobile device 100 moves along the boundary of the basic search zone, based on a determination that the mobile device 100 discovers the docking station 10, the mobile device 100 may move directly to the docking station 10 to perform charging. Based on a determination that the mobile device 100 detects the guidance signal, the mobile device 100 may move to the docking station 10 under the guidance of the guidance signal.

When the mobile device 100 moves to the target location, but the mobile device 100 cannot discover the docking station 10 or detect the guidance signal, this may be caused by the intrinsic positioning errors of the mobile device 100. For example, accumulative errors of the encoder wheel and/or the IMU of the mobile device 100 may cause the mobile device 100 to erroneously determine that it has moved to the signal sensing location B, as shown in FIG. 4F. In fact, due to the accumulative errors, the mobile device 100 may have moved to the location C, which is located outside of the signal coverage zone. Therefore, the mobile device 100 cannot detect the guidance signal at the location C. At this moment, the mobile device 100 may move along the boundary of a square search zone, which uses the location C as the center and has a predetermined edge length of 2 d, for a complete round, while searching for the guidance signal. In some embodiments, the mobile device 100 may detect the guidance signal before the mobile device 100 finishes moving along the boundary of the first search zone for a complete round. For example, when the mobile device 100 moves to the location D shown in FIG. 4F (the mobile device 100 may move along a moving direction 101 shown in FIG. 4F, counter-clockwise along the boundary of the search zone), or to the location E (in a direction opposite to the moving direction 101 shown in FIG. 4F), the mobile device 100 may start detecting the guidance signal. Under the guidance of the guidance signal, the mobile device 100 may move to the docking station 10 to perform charging successfully.

In some embodiments, when the mobile device 100 moves along the boundary of any search zone while searching for the guidance signal, the mobile device may encounter an obstacle within an actual work zone. The mobile device 100 may move along the boundary of the obstacle in the search zone, as shown in FIG. 4H. When the mobile device 100 moves to a location H shown in FIG. 4H, and encounters the obstacle in the actual work zone, the mobile device 100 may move along the boundary of the obstacle in the search zone to a location J. The mobile device 100 may continue to move, from the location J to a location K at the intersection of the obstacle and the search zone. At the location K, the mobile device 100 may continue moving along the boundary of the search zone in a direction toward the location D.

During the process of searching for the target while moving along the boundary of the basic search zone, as in step S232, based on a determination that the target has not been discovered when a first predetermined termination condition is satisfied, the mobile device 100 may terminate the regional search of the basic search zone. The first predetermined termination condition may correspond to a condition for determining that the search for the target in the basic search zone has failed, including, e.g.,: a predetermined time has lapsed, or all of the boundaries of the basic search zone have been searched. As a simple example, at this moment, the mobile device 100 may directly execute step S250: the mobile device 100 may stop moving or move to a designated location, and/or generate an alarm or an error signal. Alternatively, after the predetermined time has lapsed or after all of the boundaries of the first search zone have been searched, based on a determination that the docking station 10 has still not been discovered or the guidance signal has still not been detected, the mobile device 100 may move, within the actual work zone, along the edges of the actual work zone for a complete round while searching for the target, i.e., the docking station 10 and/or the guidance signal. Based on a determination that the target is still not discovered, the mobile device 100 may stop moving or may move to a designated location, and/or generate an alarm or an error signal.

In some embodiments, the number of searching for the target performed for a zone may be set as n. In the above step S231, the determined search zone may be the first search zone or the basic search zone, i.e., n=1. The mobile device 100 may execute step S232: the mobile device 100 may move along the boundary of the first search zone, while searching for the guidance signal and/or the docking station 10.

Figure 4G:
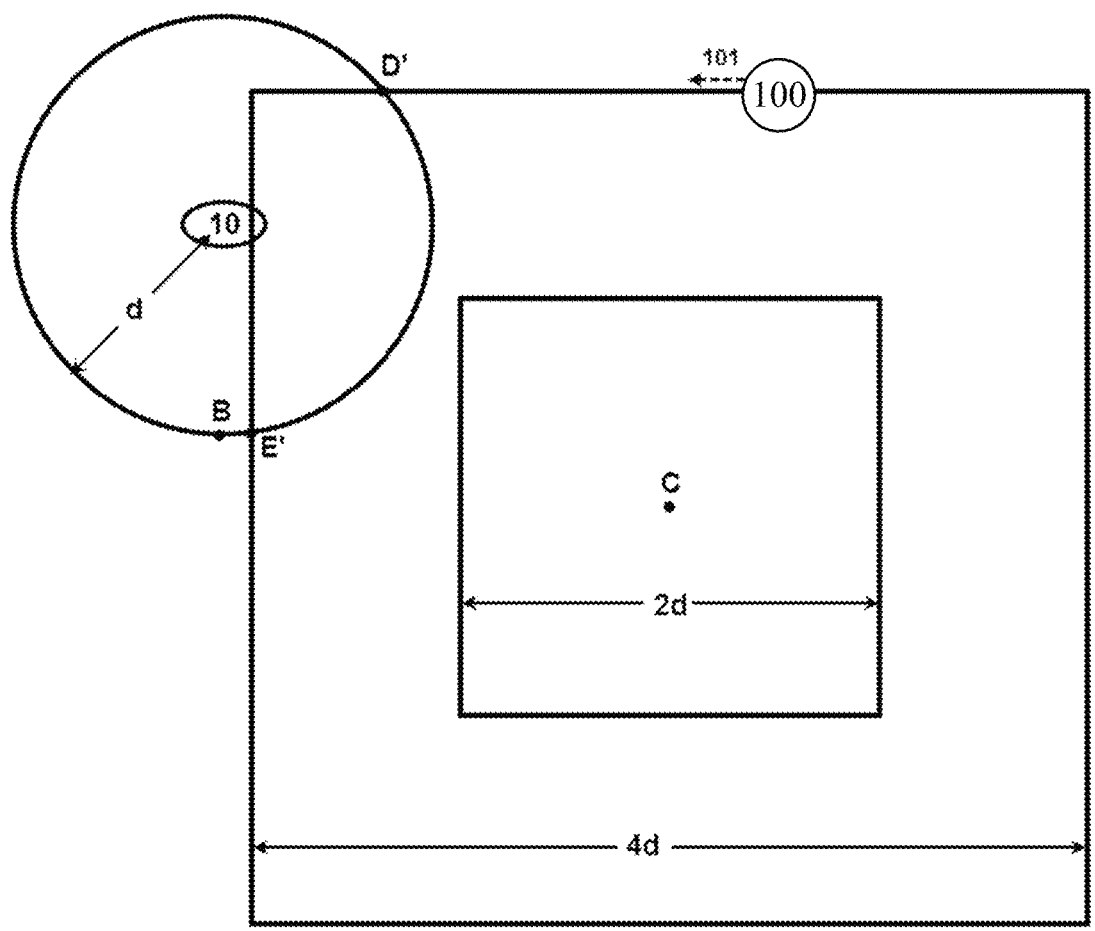
FIG. 4G is a schematic illustration of a regional search, according to an embodiment of the present disclosure.
Figure 4H:
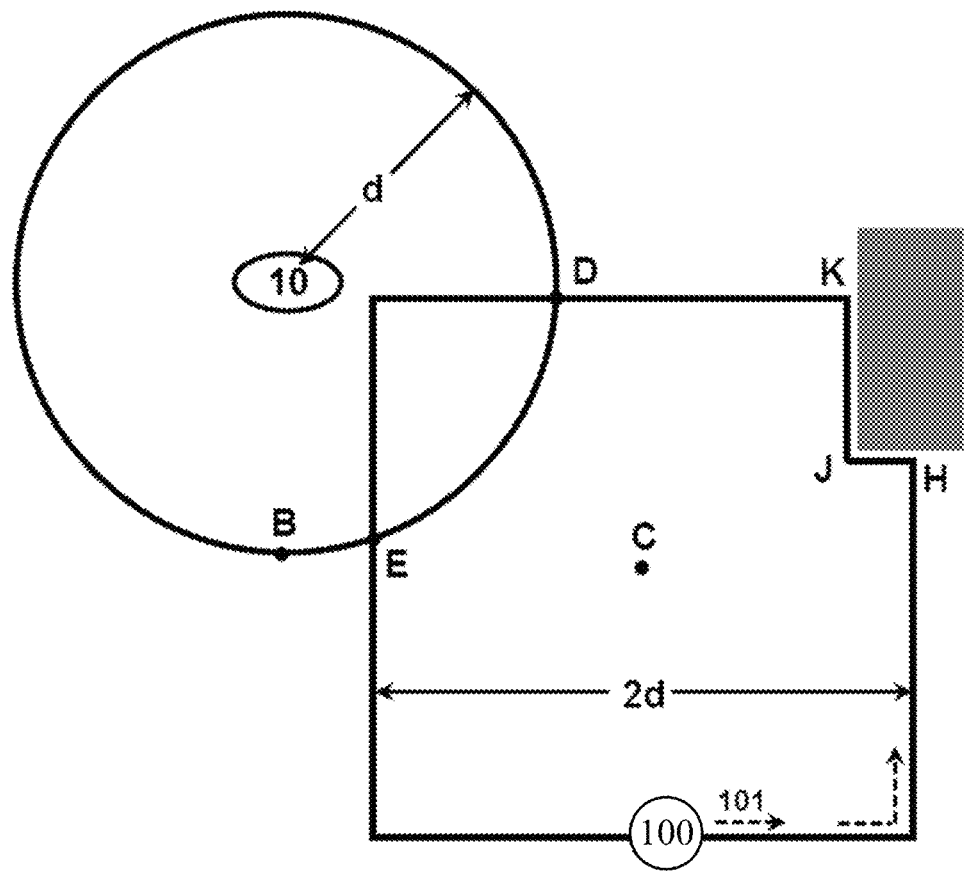
FIG. 4H is a schematic illustration of a regional search, according to an embodiment of the present disclosure.

After the mobile device 100 has moved along the boundary of the first search zone for a complete round (i.e., after having travelled along the boundary of the first search zone) or after the predetermined time has lapsed, the guidance signal or the docking station 10 has still not been discovered, it may indicate that the signal coverage zone of the docking station 10 does not overlap with the first search zone, as shown in FIG. 4G. At this moment, the mobile device 100 may set, based on the first search zone, a second search zone having a larger range and a larger circumference (n=2). For example, as shown in FIG. 4G, the second search zone may be set using the location C as the center, and 4 d as the boundary threshold. Step S232 may be executed again. That is, the mobile device 100 may move along the boundary of the second search zone while searching for the guidance signal and/or the docking station 10. When the mobile device 100 moves to a location D' or E', the mobile device 100 may detect the guidance signal. The mobile device 100 may move to the docking station 10 under the guidance of the guidance signal to perform charging successfully. Based on a determination that the guidance signal and/or the docking station has not been discovered after the mobile device 100 has moved along the boundary of the second search zone, the mobile device 100 may increase the value of n, until the value of n is equal to the pre-set number N. The number of times N for searching for the guidance signal may be pre-set. In other words, the number of times of searching to be performed by the mobile device 100 for a zone may be pre-set. As described above, the search zone established for the first time may be referred to as the first search zone or the basic search zone. The search zone established for the second time may be referred to as the second search zone, . . . , and the search zone established for the N-th time may be referred to as the N-th search zone.

Figure 5A:
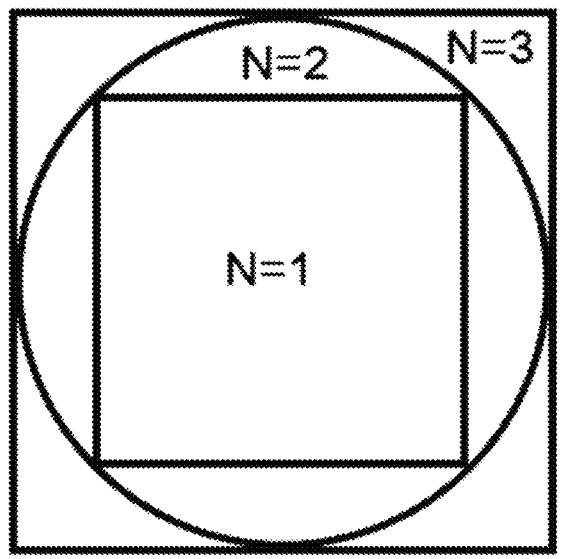
FIG. 5A is a schematic illustration of a search zone, according to an embodiment of the present disclosure.
Figure 5B:
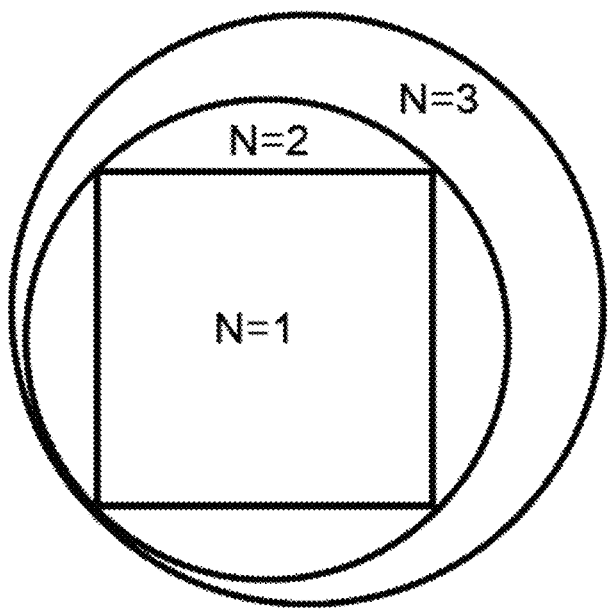
FIG. 5B is a schematic illustration of a search zone, according to an embodiment of the present disclosure.

In some embodiments, the perimeter of a latter search zone may be greater than the perimeter of a preceding search zone. In the present disclosure, the shape of the latter search zone may be the same as or different from the shape of the preceding search zone, as shown in FIG. 5A, FIG. 5B. The center of the latter search zone may or may not coincide with the center of the preceding search zone, as shown in FIG. 5A, FIG. 5B. If, within the predetermined time or within the pre-set number of times of searching for the target in a search zone, the mobile device 100 discovers the docking station 10, the mobile device 100 may move to the docking station 10. Based on a determination that the guidance signal is detected, the mobile device 100 may move to the docking station 10 under the guidance of the guidance signal.

In some embodiments, after the mobile device 100 has completed the N times of searching (N may be equal to or greater than 1), the target still has not been discovered, then step S234 may be executed: based on a determination that the docking station 10 or the guidance signal still has not been discovered within the predetermined time or after the number (e.g., N) of times of searching have been completed, the mobile device 100 may continue to move, within the actual work zone, along the edge of the actual work zone for a complete round while searching for the guidance signal and/or the docking station 10.

Because a moving device typically moves in a limited space (e.g., an indoor space), and docking stations are typically placed near the wall of the limited space (because the power cord of a docking station need to be plugged into the power outlet on the wall to receive electrical energy), when a mobile device moves along the edges of the indoor space at the inner side of the wall for a complete round, the mobile device can typically find the docking station. As shown in FIG. 4A, after the mobile device 100 completes N times of searching, the mobile device 100 may be at a location 102. The mobile device 100 may move in a direction until the mobile device encounters an edge 103 of an obstacle. There may be multiple obstacles, such as the wall and one or more objects placed in the limited space. The mobile device 100 may move along the edges of the obstacles, until the mobile device 100 discovers the docking station 10 located at a location 104, or detects the guidance signal (the signal coverage zone of the guidance signal is represented by a dashed circle around the docking station 10, as shown in FIG. 4A, FIG. 4B). The mobile device 100 can then perform charging at the docking station 10.

In some embodiments, a predetermined searching time period may be configured. Based on a determination that the mobile device 100 does not find the docking station 10 within the predetermined searching time period, the mobile device 100 may generate an alarm, and/or move to a designated location.

When the mobile device 100 stores multiple candidate locations or multiple signal sensing locations, if a distance L between the candidate locations or the signal sensing locations is much larger than the effective receiving range d (e.g., L>2 d), then during the "recharging stage," the mobile device 100 may sequentially navigate to each of the candidate locations or the signal sensing locations, or the nearby locations of the candidate locations or signal sensing locations, to search for the guidance signal. For example, as shown in FIG. 4B, at a location 112, the mobile device 100 may detect that its electric power is lower than a low electric power threshold. This may trigger the mobile device 100 to operate in the "recharging stage." The mobile device 100 may retrieve three stored candidate locations or signal sensing locations from the data storage device 191, which may be locations 113, 114, and 115 shown in FIG. 4B. In some embodiments, based on the distance between the current location 112 of the mobile device 100 and each of the candidate locations or signal sensing locations or their respective nearby locations, the mobile device 100 may sequentially navigate to the locations 113, 114, and 115 or nearby locations to search for the guidance signal. As shown in FIG. 4B, the mobile device 100 may detect the guidance signal at the location 115, thereby successfully discovering the docking station 10 to perform the charging. In some embodiments, the order of the navigation destinations (e.g., the above locations) may be determined based on the distribution of the obstacles in the actual work zone or based on other conditions (e.g., based on comparison of the confidence levels associated with the candidate locations or signal sensing locations, comparison of the densities of the candidate locations or signal sensing locations within a region or zone, or based on a totality or combination of the above factors).

In practice, after numerous experiments, the inventors discovered that when there are multiple candidate locations or signal sensing locations, the stronger the signal strength received by the mobile device 100 at a specific location, the higher the confidence level associated with using this specific location as the candidate location or signal sensing location. Therefore, in embodiments where the order of the navigation destinations is selected based on the confidence level associated with each candidate location or signal sensing location, the candidate locations or signal sensing locations may be sorted based on the strengths of the guidance signal received and stored by the mobile device 100 at the candidate locations or signal sensing locations. The mobile device 100 may perform navigation and searching based on the order of the sorted locations. For example, in FIG. 4B, if the strength of the guidance signal stored at location 112, location 113, location 114, and location 115 decreases sequentially, then the navigation route of the mobile device 100 may be arranged as: from the location 112 to the location 113, the location 114, and the location 115, i.e., in the order of the signal strength from the strongest to the weakest. The mobile device 100 may perform the navigation and searching of the docking station 10 and/or the guidance signal according to the navigation route.

In some embodiments, to further increase the recharging searching efficiency of the mobile device 100, the mobile device 100 may first compare the signal strengths of the stored guidance signals detected at the multiple candidate locations or signal sensing locations. The mobile device 100 may select an order for navigating to these destinations based on the signal strengths (e.g., from strongest to weakest) of the stored guidance signals. In some embodiments, to shorten the searching time period, and increase the system response speed of the mobile device 100, the mobile device 100 may store only two candidate locations or signal sensing locations corresponding to two guidance signals having the strongest signal strengths. If the mobile device 100 does not find the docking station 10 at those two candidate locations or signal sensing locations corresponding to the two strongest guidance signals, the mobile device 100 may terminate the regional search. For example, assuming in FIG. 4B, the guidance signals stored when the mobile device 100 is at the location 112 and the location 113 have the strongest strengths, then after searching for the docking station 10 at the location 112, the mobile device 100 may move only to the location 113 to continue the search for the docking station 10. Even if the mobile device 100 does not find the docking station 10 at the location 112 and the location 113, the mobile device 100 may not perform additional search at the other locations, such as the location 114 or the location 115.

Compared with the conventional technology, in the technical solutions of the present disclosure, the mobile device 100 may store multiple candidate locations or signal sensing locations. When the mobile device 100 does not find the docking station 10 or the guidance signal at one of the candidate locations or the signal sensing locations, the mobile device 100 may perform a regional search at the candidate location or signal sensing location. If the mobile device 100 still does not find the docking station 10 or detect the guidance signal, the mobile device 100 may enlarge the regional search scope. If the mobile device 100 still does not find the docking station 10 or detect the guidance signal, and if the mobile device 100 stores multiple target locations, the mobile device 100 may navigate to another candidate location or signal sensing location. If the mobile device 100 still does not find the docking station 10 or detect the guidance signal at the other candidate location, the mobile device 100 may again perform a regional search, until the mobile device 100 discovers the docking station 10 or a signal sensing location, or until regional searches have been performed at all of the stored candidate locations and/or signal sensing locations, or a predetermined time period for performing the regional searches has lapsed. As such, regional searches for the docking station 10 may be performed in a focused, targeted, and ordered manner. Even if the actual location of the docking station 10 and the candidate location or the signal sensing location has some deviation, the mobile device 100 may still find the docking station 10 within a shortest time frame according to a predetermined process, thereby increasing the success rate of charging.

In some embodiments, the present disclosure also provides a mobile device. The mobile device may be configured to perform the above-described docking method. The mobile device may include:

- a motion mechanism configured to drive the mobile device to move on surface, such as a floor or ground;
- a receiver (e.g., the receiver 181) configured to detect a guidance signal transmitted by a docking station;
- a processor operably coupled with the motion mechanism and the receiver;
- a data storage device configured to store processor-executable instructions;
- the processor may be configured to execute the processor-executable instructions to cause the mobile device to perform a docking method. The docking method includes:
  retrieving the stored target location of the docking station (e.g., stored in the data storage device);
  navigating to the target location;
  during navigation and/or at the target location, based on a determination that the mobile device does not find a target, performing a regional search to search for the target; and
  during navigation, or at the target location, or during the regional search, based on a determination that the target is discovered, moving to the docking station to perform charging.

The target may include: the docking station, and/or the guidance signal transmitted by the docking station.

The target location may include: the candidate location, the docking station discovering location, and/or the signal sensing location.

The candidate location is a stored location of the docking station (e.g., stored in the data storage device).

The signal sensing location may be a location where the guidance signal can be detected.

In some embodiments, the mobile device may be a cleaning robot. The cleaning robot may be a smart floor sweeping robot, a smart floor mopping robot, a window cleaning robot, etc.

In the technical solutions of the present disclosure, because a regional search of the docking station is introduced in the recharging process of the mobile device, even if there is a deviation in the docking station location or the docking station is moved, the mobile device may automatically search and find the docking station at a high probability, thereby increasing the recharging success rate of the mobile device.

In some embodiments, the present disclosure provides a docking method executable by a mobile device. The docking method may include obtaining a stored target location of a docking station. The docking method may include navigating to the target location. The docking method may include: during the navigation and/or at the target location, based on a determination that a guidance signal is not detected, performing a regional search to search for the guidance signal, the guidance signal being a signal transmitted by the docking station, receivable by the mobile device, and configured to guide the mobile device to navigate to docking station. The docking method may include: during the navigation, or at the target location, or during the regional search, based on a determination that the guidance signal is detected, moving, under the guidance of the guidance signal, to the docking station. Performing the regional search may include determining a basic search zone by setting one or more boundary thresholds based on the target location. Performing the regional search may include searching for the guidance signal while moving along boundaries of the basic search zone. Performing the regional search may include: based on a determination that the guidance signal has not been detected when a termination condition is satisfied, terminating the regional search along the boundaries of the basic search zone.

In some embodiments, the target location may be a candidate location and/or a signal sensing location. The candidate location may be a stored location of the docking station. The signal sensing location may be a location where the guidance signal is detectable or was previously detected by the mobile device. The termination condition may include: a time period has lapsed, or all boundaries of the basic search zone have been searched along.

In some embodiments, performing the regional search may also include: based on a determination that the guidance signal has not been detected when the termination condition is satisfied, determining a second search zone based on one or more second boundary thresholds, a perimeter of the second search zone being greater than a perimeter of the basic search zone. Performing the regional search may include searching for the guidance signal along boundaries of the second search zone.

In some embodiments, the docking method may also include: based on a determination that the guidance signal is not detected in the regional search, searching for the guidance signal while moving, within an actual work zone of the mobile device, along edges of the actual work zone until detecting the guidance signal or making a complete round along the edges of the actual work zone.

In some embodiments, the docking method may also include: based on a determination that the guidance signal is not detected within a predetermined search time during the process of searching for the guidance signal while moving, within the actual work zone, along the edges of the actual work zone, generating an alarm and/or moving to a designated location.

In some embodiments, when the target location includes a plurality of target locations, navigating to the target location may include: navigating to each of the plurality of target locations based on distances between the target locations and a current location of the mobile device, according to an order from a shortest distance to a longest distance.

In some embodiments, when the target location includes a plurality of target locations, navigating to the target location may include: navigating to each of the plurality of target locations based on a distribution of obstacles within an actual work zone.

In some embodiments, when the target location includes a plurality of target locations, navigating to the target location may include: navigating to each of the plurality of target locations based on confidence levels associated with the target locations, according to an order from a highest confidence level to a lowest confidence level.

In some embodiments, the present disclosure provides a docking method executable by a mobile device. The docking method may include obtaining a stored target location of a docking station. The docking method may include navigating to the target location. The docking method may include: during the navigation and/or at the target location, based on a determination that the docking station is not discovered, performing a regional search to search for the docking station. The docking method may include: during the navigation, or at the target location, or during the regional search, based on a determination that the docking station is discovered, moving to the docking station. Performing the regional search may include: determining a basic search zone by setting one or more boundary thresholds based on the target location. Performing the regional search may also include searching for the docking station while moving along boundaries of the basic search zone. Performing the regional search may further include: based on a determination that the docking station has not been discovered when a termination condition is satisfied, terminating the regional search along the boundaries of the basic search zone.

In some embodiments, the target location may be a candidate location and/or a docking station discovering location. The candidate location may be a stored location of the docking station. The docking station discovering location is a location where the docking station is discoverable or was previously discovered by the mobile device. The termination condition may include: a time period has lapsed, or all boundaries of the basic search zone have been searched along.

In some embodiments, performing the regional search may include: based on a determination that the docking station has not been discovered when the termination condition is satisfied, determining a second search zone based on one or more second boundary thresholds, a perimeter of the second search zone being greater than a perimeter of the basic search zone. Performing the regional search may also include searching for the docking station along boundaries of the second search zone.

In some embodiments, the docking method may include: based on a determination that the docking station is not discovered after the regional search, searching for the docking station while moving, within an actual work zone of the mobile device, along edges of the actual work zone until discovering the docking station or making a complete round along the edges of the actual work zone.

In some embodiments, the docking method may include: based on a determination that the docking station is not discovered within a predetermined search time during the process of searching for the docking station while moving, within the actual work zone, along the edges of the actual work zone, generating an alarm and/or moving to a designated location.

In some embodiments, when the target location includes a plurality of target locations, navigating to the target location may include: navigating to each of the plurality of target locations based on distances between the target locations and a current location of the mobile device, according to an order from a shortest distance to a longest distance; and/or navigating to each of the plurality of target locations based on a distribution of obstacles within an actual work zone; and/or navigating to each of the plurality of target locations based on confidence levels associated with the target locations, according to an order from a highest confidence level to a lowest confidence level.

In some embodiments, the present disclosure provides a mobile device. The mobile device may include a motion mechanism configured to move the mobile device on a surface. The mobile device may also include a receiver configured to detect a guidance signal transmitted from a docking station. The mobile device may also include a processor operably coupled with the motion mechanism and the receiver. The mobile device may also include a data storage device configured to store processor-executable instructions. The processor may be configured to obtain a stored target location of the docking station from the data storage device. The processor may be configured to control the motion mechanism to navigate the mobile device to the target location. The processor may be configured to, based on a determination that the guidance signal is not detected during the navigation and/or at the target location, control the motion mechanism and the receiver to perform a regional search to search for the guidance signal. The guidance signal may be configured to guide the mobile device to navigate to docking station. The processor may be configured to, based on a determination that the guidance signal is detected during the navigation, at the target location, or during the regional search, control the motion mechanism to navigate the mobile device, under the guidance of the guidance signal, to the docking station. When performing the regional search, the processor may be configured to determine a basic search zone by setting one or more boundary thresholds based on the target location. When performing the regional search, the processor may also be configured to control the motion mechanism and the receiver to search for the guidance signal along boundaries of the basic search zone. When performing the regional search, the processor may be configured to, based on a determination that the guidance signal has not been detected when a termination condition is satisfied, terminate the regional search along the boundaries of the basic search zone.

In some embodiments, when performing the regional search, the processor is further configured to: based on a determination that the guidance signal has not been detected when the termination condition is satisfied, determine a second search zone based on one or more second boundary thresholds, a perimeter of the second search zone being greater than a perimeter of the basic search zone. When performing the regional search, the processor is further configured to: control the motion mechanism and the receiver to search for the guidance signal along boundaries of the second search zone.

In some embodiments, the present disclosure provides a mobile device. The mobile device may include a motion mechanism configured to move the mobile device on a surface. The mobile device may also include a sensor configured to discover a docking station. The mobile device may also include a processor operably coupled with the motion mechanism and the sensor. The mobile device may also include a data storage device configured to store processor-executable instructions. The processor may be configured to retrieve a stored target location of the docking station from the data storage device. The processor may be configured to control the motion mechanism to navigate the mobile device to the target location. The processor may be configured to, based on a determination that the docking station is not discovered during the navigation and/or at the target location, control the motion mechanism and the sensor to perform a regional search to search for the docking station. The processor may be configured to, based on a determination that the docking station is discovered during the navigation, at the target location, or during the regional search, control the motion mechanism to navigate the mobile device to the docking station. When performing the regional search, the processor may be configured to determine a basic search zone by setting one or more boundary thresholds based on the target location. When performing the regional search, the processor may be configured to control the motion mechanism and the sensor to search for the docking station along boundaries of the basic search zone. When performing the regional search, the processor may be configured to, based on a determination that the docking station has not been discovered when a termination condition is satisfied, terminate the regional search along the boundaries of the basic search zone.

In some embodiments, when performing the regional search, the processor may be configured to: based on a determination that the docking station has not been discovered when the termination condition is satisfied, determine a second search zone based on one or more second boundary thresholds, a perimeter of the second search zone being greater than a perimeter of the basic search zone. When performing the regional search, the processor may be configured to control the motion mechanism and the sensor to search for the docking station along boundaries of the second search zone.

It should be noted that in the above descriptions of exemplary embodiments, the signal sensing location may have been described or illustrated in the figures. It is understood that in certain descriptions, the signal sensing location may be replaced by the docking station discovering location when the sensor 175 is used to discover the docking station.

It should be understood that although in the above descriptions of various embodiments, detecting the guidance signal is used as an example of means for detecting the docking station, the docking station may be detected based on, for example, detecting an identification feature (such as a patterned image or a bar code image) attached or affixed to the docking station, as described above. Other steps of the methods may be similarly carried out based on the detection of the identification feature. Even though the details of such steps are not repeated for the sake of simplicity, a person having ordinary skills in the art would understand that the methods described above can be modified to be based on the detection of the identification feature of the docking station, and such modifications of the above-described embodiments are within the scope of the present disclosure.

It should be understood that the same or similar features shown in different embodiments may be cross-referenced. Features that are not described in detail in some embodiments can refer to the descriptions of the same or similar features included in other embodiments.

It should be understood that in the present descriptions, the terms "first," "second," etc., are only used for descriptive purposes, and are not intended to express or indicate the relative importance. In addition, in the present descriptions, unless otherwise noted, the term "multiple" means at least two.

The above descriptions of the embodiments are illustrative and are not intended to limit the scope of the present disclosure. A person having ordinary skills in the art can change, modify, substitute, or vary the above-described embodiments within the scope of the present disclosure. The scope of the present disclosure is defined in the appended claims.

What is claimed is:

1. A docking method executable by a mobile device, the docking method comprising:
    obtaining a stored target location, wherein the target location is a signal sensing location previously stored in a data storage device, and wherein the signal sensing location is a location where the mobile device previously detected a guidance signal transmitted by a docking station;
    navigating to the target location;
    during the navigation and/or at the target location, searching for the guidance signal, and based on a determination that the guidance signal is not detected, performing a regional search to search for the guidance signal, the guidance signal transmitted by the docking station being receivable by the mobile device and being configured to guide the mobile device to navigate to docking station; and
    during the navigation, or at the target location, or during the regional search, based on a determination that the guidance signal is detected, moving, under the guidance of the guidance signal, to the docking station,
    wherein performing the regional search comprises:
        determining a basic search zone by setting one or more boundary thresholds based on the target location;
        searching for the guidance signal while moving along boundaries of the basic search zone; and
        based on a determination that the guidance signal has not been detected when a termination condition is satisfied, terminating the regional search along the boundaries of the basic search zone.

2. The docking method of claim 1, wherein
the termination condition includes: a time period has lapsed, or all boundaries of the basic search zone have been searched along.

3. The docking method of claim 1, wherein performing the regional search further comprises:
    based on a determination that the guidance signal has not been detected when the termination condition is satisfied, determining a second search zone based on one or more second boundary thresholds, a perimeter of the second search zone being greater than a perimeter of the basic search zone; and
    searching for the guidance signal along boundaries of the second search zone.

4. The docking method of claim 1, further comprising:
    based on a determination that the guidance signal is not detected in the regional search, searching for the guidance signal while moving, within an actual work zone of the mobile device, along edges of the actual work zone until detecting the guidance signal or making a complete round along the edges of the actual work zone.

5. The docking method of claim 4, further comprising:
    based on a determination that the guidance signal has not been detected within a predetermined search time during the process of searching for the guidance signal while moving, within the actual work zone, along the edges of the actual work zone, generating an alarm and/or moving to a designated location.

6. The docking method of claim 1, wherein when the target location includes a plurality of target locations, navigating to the target location comprises:
    navigating to each of the plurality of target locations based on distances between the target locations and a current location of the mobile device, according to an order from a shortest distance to a longest distance.

7. The docking method of claim 1, wherein when the target location includes a plurality of target locations, navigating to the target location comprises:
    navigating to each of the plurality of target locations based on a distribution of obstacles within an actual work zone.

8. The docking method of claim 1, wherein when the target location includes a plurality of target locations, navigating to the target location comprises:
    navigating to each of the plurality of target locations based on confidence levels associated with the target locations, according to an order from a highest confidence level to a lowest confidence level.

9. A mobile device, comprising:
    a motion mechanism configured to move the mobile device on a surface;
    a receiver configured to detect a guidance signal transmitted from a docking station;
    a processor operably coupled with the motion mechanism and the receiver; and
    a data storage device configured to store processor-executable instructions,
    wherein the processor is configured to:
        obtain a stored target location of the docking station from the data storage device, wherein the target location is a signal sensing location previously stored in the data storage device, and wherein the signal sensing location is a location where the receiver previously detected the guidance signal transmitted by the docking station;
        control the motion mechanism to navigate the mobile device to the target location, wherein during the navigation to the target location and/or at the target location, the receiver searches for the guidance signal;
        based on a determination that the guidance signal is not detected during the navigation and/or at the target location, control the motion mechanism and the receiver to perform a regional search to search for the guidance signal, wherein the guidance signal is configured to guide the mobile device to navigate to docking station; and
        based on a determination that the guidance signal is detected during the navigation, at the target location, or during the regional search, control the motion mechanism to navigate the mobile device, under the guidance of the guidance signal, to the docking station,
    wherein when performing the regional search, the processor is configured to:
        determine a basic search zone by setting one or more boundary thresholds based on the target location;
        control the motion mechanism and the receiver to search for the guidance signal along boundaries of the basic search zone; and
        based on a determination that the guidance signal has not been detected when a termination condition is satisfied, terminate the regional search along the boundaries of the basic search zone.

10. The mobile device of claim 9, wherein the termination condition includes: a time period has lapsed, or all boundaries of the basic search zone have been searched along.

11. The mobile device of claim 9, wherein when performing the regional search, the processor is further configured to:
- based on a determination that the guidance signal has not been detected when the termination condition is satisfied, determine a second search zone based on one or more second boundary thresholds, a perimeter of the second search zone being greater than a perimeter of the basic search zone; and
- control the motion mechanism and the receiver to search for the guidance signal along boundaries of the second search zone.

* * * * *